US006722985B2

(12) United States Patent
Criss-Puszkiewicz et al.

(10) Patent No.: US 6,722,985 B2
(45) Date of Patent: Apr. 20, 2004

(54) UNIVERSAL PLAYER TRACKING SYSTEM

(75) Inventors: Cynthia Criss-Puszkiewicz, Reno, NV (US); Steven G. LeMay, Reno, NV (US); Richard E. Rowe, Reno, NV (US)

(73) Assignee: IGT, Reno, NV (US)

( * ) Notice: Subject to any disclaimer, the term of this patent is extended or adjusted under 35 U.S.C. 154(b) by 206 days.

(21) Appl. No.: 09/838,033

(22) Filed: Apr. 19, 2001

(65) Prior Publication Data

US 2002/0155887 A1 Oct. 24, 2002

(51) Int. Cl.[7] ............................................. G06F 17/00
(52) U.S. Cl. ........................ 463/29; 463/46; 273/148 R; 273/148 B
(58) Field of Search .......................... 463/29, 16, 42, 463/1, 11–12, 13, 17, 18–20, 25, 30, 40, 41, 46, 47; 235/380, 375, 382; 700/90, 92, 97; 273/138.1, 138.2, 139, 143 R, 292, 293; 382/100, 115, 118

(56) References Cited

U.S. PATENT DOCUMENTS

| 4,301,505 A |   | 11/1981 | Catiller et al. ............... 364/200 |
| 4,652,998 A |   | 3/1987  | Koza et al. .................. 364/412 |
| 5,367,644 A |   | 11/1994 | Yokoyama et al. ......... 395/325 |
| 5,379,382 A |   | 1/1995  | Work et al. .................. 395/275 |
| 5,429,361 A | * | 7/1995  | Raven et al. ................. 463/25 |
| 5,559,794 A |   | 9/1996  | Willis et al. ................ 370/58.3 |
| 5,643,086 A |   | 7/1997  | Alcorn et al. ................ 463/29 |
| 5,655,961 A |   | 8/1997  | Acres et al. .................. 463/27 |
| 5,708,838 A |   | 1/1998  | Robinson .................... 395/800 |
| 5,721,958 A |   | 2/1998  | Kikinis ....................... 395/888 |
| 5,741,183 A |   | 4/1998  | Acres et al. .................. 463/42 |
| 5,752,882 A |   | 5/1998  | Acres et al. .................. 463/42 |
| 5,759,102 A |   | 6/1998  | Pease et al. .................. 463/42 |
| 5,761,647 A |   | 6/1998  | Boushy ....................... 705/10 |
| 5,820,459 A |   | 10/1998 | Acres et al. .................. 463/25 |
| 5,836,817 A |   | 11/1998 | Acres et al. .................. 463/26 |
| 5,876,284 A |   | 3/1999  | Acres et al. .................. 463/25 |
| 5,958,020 A |   | 9/1999  | Evoy et al. ................... 710/3 |

(List continued on next page.)

OTHER PUBLICATIONS

Members of B–Link Technical Committee, "Summary of Comment Regarding Adoption of Internal Bus Standard for Electronic Gaming Machines,", 2 Pages, Oct. 26,1999.

Jim Stockdale, Description of the IGT Netplex Associated Interface System, pp. 1–2; System used in public prior to Oct. 6, 1998.

Wang et al., "Casino Technology: Player Tracking and Slot Accounting Systems", Gaming Res. Rev. J. (USA), Gaming Research & Review Journal, Univ. Nevada (Abstract).

*Primary Examiner*—Teresa Wallberg
*Assistant Examiner*—Yveste G. Cherubin
(74) *Attorney, Agent, or Firm*—Beyer, Weaver & Thomas LLP

(57) ABSTRACT

A disclosed player tracking unit utilizes a memory arranged to store a plurality of different communication protocols allowing the player tracking unit to communicate with a plurality of different types of gaming machines and a plurality of different types of player tracking servers. The player tracking unit may contain many different types of player tracking peripheral devices such as card readers, key pads, displays, bonus buttons and biometric input mechanisms. The peripheral devices contained in the player tracking unit may be accessible to the master gaming controller on a gaming machine and may be utilized by the master gaming controller for other gaming applications. The player tracking unit may be designed with a standard housing and standard device layout allowing the player tracking unit to fit in many different types of gaming machines with minimal modifications to the gaming machine or the player tracking unit.

111 Claims, 10 Drawing Sheets

U.S. PATENT DOCUMENTS

| | | | |
|---|---|---|---|
| 5,978,920 A | 11/1999 | Lee | 713/202 |
| 6,003,013 A | 12/1999 | Boushy et al. | 705/10 |
| 6,071,190 A | 6/2000 | Weiss et al. | 463/25 |
| 6,088,802 A | 7/2000 | Bialick et al. | 713/200 |
| 6,104,815 A | 8/2000 | Alcorn et al. | 380/251 |
| 6,106,396 A | 8/2000 | Alcorn et al. | 463/29 |
| 6,110,041 A * | 8/2000 | Walker et al. | 463/20 |
| 6,117,010 A | 9/2000 | Canterbury et al. | 463/20 |
| 6,135,884 A * | 10/2000 | Hedrick et al. | 463/20 |
| 6,135,887 A | 10/2000 | Pease et al. | 463/42 |
| 6,149,522 A | 11/2000 | Alcorn et al. | 463/29 |
| 6,162,122 A | 12/2000 | Acres et al. | 463/29 |
| 6,183,362 B1 | 2/2001 | Boushy | 463/25 |
| 6,251,014 B1 * | 6/2001 | Stockdale et al. | 463/16 |
| 6,368,216 B1 | 4/2002 | Hedrick et al. | 463/20 |

* cited by examiner

UNIVERSAL PLAYER TRACKING SYSTEM

CROSS REFERENCE TO RELATED U.S. PATENT APPLICATIONS

This application is related to U.S. patent application Ser. No. 09/414,659 entitled STANDARD PERIPHERAL COMMUNICATION, filed Oct. 6, 1999 and U.S. patent application Ser. No. 09/642,192 entitled GAMING MACHINE VIRTUAL PLAYER TRACKING AND RELATED SERVICES, filed Aug. 18, 2000 each of which is incorporated herein by reference in its entirety for all purposes.

BACKGROUND OF THE INVENTION

This invention relates to game playing services for gaming machines such as slot machines and video poker machines. More particularly, the present invention relates to methods of providing player tracking game services to casinos and game players.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

For gaming machine operators, an important aspect of gaming machine operations is determining the game playing habits of individual game players. When the game playing habits of an individual player are known, the gaming machine operator may provide incentives corresponding to the game playing habits of the individual game player to encourage additional game play. For example, the gaming machine operator may provide an individual player with coupons for free meals, free rooms or discounted game play depending on their game playing habits. The game playing habits of individual game players are typically determined by monitoring game usage on a gaming machine using a player tracking unit. The player tracking unit collects game usage data and player identification information from the gaming machine which is sent to a remote server for archival and analysis purposes.

Currently, player tracking units are usually manufactured as an after-market device separate from the gaming machine. Many different companies manufacture player tracking units as part of player tracking/accounting systems. These player tracking/accounting systems are used in most casinos. While the type of player tracking system varies from casino to casino, a particular casino will utilize only one type of player tracking system (i.e. from one manufacturer).

FIG. 1 is a block diagram of two gaming machines, 100 and 101, with player tracking units connected to two servers, 120 and 121, providing player tracking/accounting services. Characteristics of a player tracking accounting/system such as dimensions of the player tracking unit, communication protocols used by the player tracking unit, dimensions and layout of player tracking devices contained in the player tracking unit, connection schemes and mounting of the player tracking unit to the gaming machine, vary from manufacturer to manufacturer. Thus, to illustrate differences among player tracking systems manufactured by different companies and their impact gaming machine design and operation, the gaming machines, 100 and 101, are described with representative features of different player tracking systems.

A first player tracking unit comprising, a device box 107 and slot machine interface board (SMIB) 103, is mounted within the top box 117 on top the main cabinet 118 of the gaming machine 100 with a display 102. On a video gaming machine, a player may view a game presentation on the display 102. A second player tracking unit comprising, a device box 104 and SMIB 105, is mounted the main cabinet 118 of the gaming machine 100. Each player tracking unit utilizes a display, key pad and card reader enclosed within a device housing or chassis of some type, 104 and 107. The devices incorporated in a player tracking unit may vary. Some player tracking units have only a display and a card reader with no key pad, others have a display, a card reader, a key pad and a bonus button, while others have a display, a card reader and a bonus button with no key pad.

Typically, the dimensions of the device housings, 104 and 107, differ among manufacturers. For instance, the frontal area of housing 107 is smaller than 104. Further, the player tracking devices in the device housings, 104 and 107, may be of different sizes, which may affect the dimensions of the device housing such as the depth that the device housing extends into the gaming machine. Also, the layout of the player tracking devices within the device housings and the dimensions of each device may differ. For example, a key pad 115 is wider and longer than a key pad 114 and is located below a card reader 109 while the key pad 114 is located across from the card reader 108.

Many other player tracking unit specifications are also variable. For instance, within each device housing, each of the player tracking devices may be attached to the device housing in a different manner which varies depending on the manufacturer of a particular tracking device. Further, different attachment means may be supplied with each device housing for attaching the player tracking unit to a gaming machine which also varies from manufacturer to manufacturer. Also, connection schemes (e.g. pin connectors), cabling and power requirements supplied with each player tracking unit may vary from manufacturer to manufacturer.

Many player tracking units include a separate slot machine interface board (SMIB), such as 103 and 106, which may be mounted in a location within the gaming machine which is separate from the device housings, 104 and 107. For instance, in gaming machine 100, the SMIB 106 is mounted within the top box 117 opposite the device housing 107 and in gaming machine 101, the SMIB 103 is mounted within the main cabinet 118 below the device housing 104. Like the device housings, 104 and 107, the dimensions of the SMIBs, 103 and 106, physical attachments and connection schemes, cabling and power requirements may vary depending on the manufacturer of the SMIB.

The SMIBs, 103 and 106, are used to collect game usage information from the gaming machine (e.g. 100 or 101) which is transmitted to a player tracking/accounting server such as 120 and 121 using a network interface of some type such as the main communication board 110. Via the network interface, the SMIB's may communicate with a data collection unit 116. Each data collection unit (DCU) 116 may be connected to as many as thirty two different SMIBs where each SMIB resides on a different gaming machine. The DCU's consolidate the information gathered from the SMIBs connected to the DCU 116 and forward the information to a player tracking account server such as 120 or 121.

Each type of player tracking/accounting server 120 and 121 and associated player tracking unit may utilize a different communication protocol to communicate game usage information and player tracking information collected by its associated SMIB over the network interface. For instance, player tracking/accounting server 120 and SMIB 103 may use a Slot Accounting System (SAS) protocol provided by IGT (Reno, Nev.) to communicate game usage information while player tracking/accounting server 121 and SMIB 106 may use a Slot Data System (SDS) protocol provided by Bally gaming systems (Las Vegas, Nev.).

To collect gaming information from a gaming machine, the player tracking unit may poll the gaming machine for information. For example, the player tracking unit 120 may poll the master gaming controller 125 to determine how much money the game player has wagered on each game, the time when each game was initiated and the location of the gaming machine. The master gaming controller 104 replies to the information requests from the player tracking unit with the requested gaming information. To the master gaming controller 104, the player tracking unit is a black box. Thus, the master gaming controller does not operate the player tracking unit in any manner. For instance, the master gaming controller does not communicate with or may not send commands to the devices residing in the player tracking unit such as the card readers, 108 and 109, the displays, 112 and 113, or the key pad, 114 and 115.

For gaming machine operators and gaming machine manufacturers, a number of disadvantages arise from the lack of standardization among player tracking units. A first disadvantage is that the variations of the player tracking units from manufacturer to manufacturer add to the complexity of the design of the gaming machine. Currently, there are at least 19 different companies that manufacturer player tracking units that may be mounted in a gaming machine. Typically, as described above, each of these companies use different hardware and different communication protocols to design the player tracking unit.

To accommodate gaming machine operators with different player tracking requirements, gaming machine manufacturers design their gaming machines to accommodate as many types of player tracking units as possible. To accommodate player tracking units from different manufacturers custom parts may have to be designed. For instance, custom mounting brackets within the gaming machine 100 may be needed that can accommodate different player tracking mounting hardware from each of the 19 manufacturers of player tracking units. Gathering the information needed to design a particular mounting bracket, designing the part and then repeating it for each manufacture requires significant resources.

The variation in player tracking units impact gaming machine design in other ways. For instance, the gaming machine components within the gaming machine are packaged to allow room for player tracking units and/or data collection units with widely varying dimensions which complicates the design of the gaming machine. As yet another example, the frontal area of each housing is covered with a decorative faceplate consistent with a decorative theme of the particular gaming machine. Thus, a decorative face plate must be designed for each gaming machine that is consistent with the layout, dimensions and mounting requirements for each type of player tracking unit. Often to satisfy the requirements of a particular player tracking unit, a custom installation kit is designed. At the operating location of the casino, the gaming machine operator may install the player tracking units into an assembled gaming machine using the installation kit which adds to the cost of purchasing and installing the gaming machine.

A second disadvantage of current player tracking units is a limited communication capability. Typically, as described above, player tracking units communicate in only one fixed communication protocol to a player tracking accounting server where the communication protocols used by each player tracking unit tend to vary according to the manufacturer of the player tracking unit. Network gaming services, which require communicating ever larger amounts of information, are becoming increasingly important in the gaming industry. The limited communication capabilities of current player tracking units make it difficult for a gaming machine operator to upgrade player tracking services. For instance, to upgrade the communication protocol on an existing player tracking server or to utilize a new player tracking server that utilizes a more efficient communication protocol to transfer gaming information, a casino operator might have to replace expensive player tracking units in all of its gaming machines to enable communications with the new player tracking server. When completed, only one model of many would have the enhanced capability and the same effort would need to be repeated for many various models of player tracking units.

A third disadvantage of separate hardware player tracking units is that the devices utilized by the player tracking unit, such as the displays, 112 and 113, the key pads, 114 and 115, and card readers, 108 and 109, are not accessible to the master gaming controllers, 104, within the gaming machines, 100 and 101. Thus, for example, the master gaming controller can not use the card reader (e.g. 108 or 109) for other gaming applications requiring a card reader. Therefore, if a gaming application executed on the gaming machine requires a card reader, a second card reader may has to be installed on the gaming machine. Since one card reader may be sufficient for use in multiple gaming applications, the installation of a second card reader may be very inefficient.

In view of the above, it would be desirable to provide a less expensive, less complicated and more efficient methods and apparatus of providing player tracking services for a gaming machine.

SUMMARY OF THE INVENTION

This invention addresses the needs indicated above by providing a player tracking unit with a memory arranged to store a plurality of different communication protocols allowing the player tracking unit to communicate with a plurality of different types of gaming machines and a plurality of different types of player tracking servers. The software on the player tracking unit may be designed or configured to accommodate new player tracking features such as new communication protocols. The player tracking unit may contain many different types of player tracking peripheral devices such as card readers, key pads, displays, bonus buttons and biometric input mechanisms. The peripheral devices contained in the player tracking unit may be accessible to the master gaming controller on a gaming machine and may be utilized by the master gaming controller for other gaming applications. The player tracking units may use standard components allowing the player tracking unit to fit in many different types of gaming machines with minimal modifications to the player tracking unit or the gaming machine.

One aspect of the present invention provides a player tracking unit. The player tracking unit may be generally characterized as including: 1) one or more of the following peripheral devices: a card reader, a display, a key pad, a bonus button and a biometric input device; 2) a logic device designed or configured a) to collect player tracking information from the peripheral devices, b) to collect accounting information from a master gaming controller on a gaming machine and c) to send the player tracking information and the accounting information to a player tracking server; and 3) a memory arranged to store a plurality of different communication protocols allowing the logic device to communicate with a plurality of different types of gaming machines using different communication protocols to communicate with the player tracking unit and a plurality of different types of player tracking servers using different communication protocols to communicate with the player tracking unit. The memory may be also arranged to store a plurality of device drivers for each type of peripheral device.

In particular embodiments, the player tracking unit may employ a standard housing for enclosing the logic device and the peripheral devices which is designed or configured to fit in one of a plurality of different types of gaming machines where the standard housing may conform to at least one of standard dimensions and a standard layout of the peripheral devices. The player tracking unit may also employ a number of different standard mounting means designed or configured to mount a) one of a plurality of different types of card readers in the player tracking unit b) one of a plurality of different types of displays in the player tracking unit and c) one of a plurality of different types of key pads in the player tracking unit. In addition, a standard device housing which is separate from the logic device housing and which is designed or configured to fit in one of a plurality of different types of gaming machines and enclose the one or more peripheral devices, may be used for the player tracking unit where the standard device housing conforms to at least one of standard dimensions and a standard layout for the peripheral devices. Further, a standard logic device housing which is separate from the logic device housing and which is designed or configured to fit in one of a plurality of different types of gaming machines and enclose the logic device, may be used for the player tracking unit.

In particular embodiments, the player tracking unit may also include a) a network interface where the network interface is a wireless interface or a wired interface and b) a firewall. The card reader may be designed or configured to read a smart card or write to the smart card and the biometric input device may be a finger print device. Further, the logic device may be a microcontroller or a microprocessor.

In a specific embodiment, the player tracking unit may include a peripheral communications connection where the logic device is designed or configured to communicate with the master gaming controller via the peripheral communication connection using a standard communication protocol where the standard communication protocol may be USB. Further, the logic device may be designed or configured to receive from the master gaming controller operation instructions for one or more peripheral devices. The player tracking unit may also include a hub connected to the peripheral communications connection and containing a plurality of peripheral communications connections.

Another aspect of the present invention provides a gaming machine with a player tracking unit. The gaming machine may be generally characterized as including 1) a master gaming controller designed or configured to control one or more games on the gaming machine and 2) a player tracking unit comprising; a) one or more of the following peripheral devices: a card reader, a display, a key pad, a bonus button and a biometric input device; b) a logic device, separate from the master gaming controller, designed or configured to collect player tracking information from the peripheral devices, to collect accounting information from a master gaming controller on a gaming machine and send the player tracking information and the accounting information to a player tracking server; and c) a memory arranged to store a plurality of different communication protocols allowing the logic device to communicate with a plurality of different types of gaming machines and a plurality of different types of player tracking servers. The game controlled by the master gaming controller may be a video bingo game, a video lottery game, a video black jack game, a video slot game, a mechanical slot game, a video poker game, a video keno game, a video pachinko game, a video game of chance and a video card game. Further, the gaming machine may include mounting means designed to mount a player tracking unit enclosed in a standard housing.

In particular embodiments, the master gaming controller may include a memory arranged to store software that allows the master gaming controller to detect gaming events on the one or more peripheral devices and the logic on the player tracking unit may be designed or configured to receive instructions from the master gaming controller controlling the operation of one or more of the peripheral devices. The gaming machine may also include a peripheral communication connection. Thus, the master gaming controller may include a memory arranged to store software for a communication protocol that allows communication with the player tracking unit via the peripheral communication connection where the communication protocol is USB.

Another aspect of the present invention provides a player tracking gaming peripheral. The player tracking gaming peripheral may be characterized as including: 1) a peripheral communication connection; and 2) a peripheral controller configured or designed to control communications with a master gaming controller in a gaming machine and to receive instructions from the master gaming controller for one or more of the following peripheral devices: a card reader, a display, a key pad, a bonus button and a biometric input device where the instructions from the master gaming controller allow the player tracking gaming peripheral to operate on player tracking events.

In particular embodiments, the player tracking gaming peripheral may include one or more of the following: a) a peripheral interface that directly connects to the one or more peripheral devices, b) hub connected to the peripheral communications connection and containing a plurality of peripheral communications connections, c) a standard housing for the player tracking gaming peripheral designed or configured to fit in one of a plurality of different types of gaming machines wherein the standard housing conforms to at least one of standard dimensions and a standard layout of the peripheral devices, d) a standard mounting means designed or configured to mount one of a plurality of different types of card readers in the player tracking gaming peripheral, e) a standard mounting means designed or configured to mount one of a plurality of different types of displays in the player tracking gaming peripheral and f) a standard mounting means designed or configured to mount one of a plurality of different types of key pads in the player tracking gaming peripheral.

In other embodiments, the peripheral controller may include one or more of the following: 1) a control microprocessor, separate from the master gaming controller, designed or configured to communicate over the peripheral communications connection, 2) a non-volatile memory arranged to store at least one of i) configuration parameters specific to the player tracking gaming peripheral and ii) state history information of the player tracking gaming peripheral, 3) a non-volatile memory arranged to store operating code for the gaming peripheral, 4) a memory arranged to store a plurality of device drivers for each type of peripheral device and 5) a memory arranged to store software for a communication protocol that allows communication with the master gaming controller where the communication protocol may be USB.

Another aspect of the present invention provides a gaming machine with a player tracking gaming peripheral. The gaming machine may be generally characterized as including: 1) a master gaming controller designed or configured to control one or more games on the gaming machine; 2) a network interface for communicating with a player tracking server; and 3) a player tracking gaming peripheral, the player tracking gaming peripheral comprising; i) a peripheral communication connection; and ii) a peripheral controller configured or designed to control communications with the master gaming controller and to receive instructions from the master gaming controller for one or more of the following peripheral devices: a card reader, a display, a key pad, a bonus button and a biometric input device wherein the instructions from the master gaming controller allow the player tracking gaming peripheral to operate on player tracking events. In specific embodiments, the gaming machine may include mounting means designed to mount a player tracking gaming peripheral enclosed in a standard housing and the game controlled by the master gaming controller may be a video bingo game, a video lottery game, a video black jack game, a video slot game, a mechanical slot game, a video poker game, a video keno game, a video pachinko game, a video game of chance and a video card game.

In particular embodiments, the master gaming controller may include one or more of the following: a) a memory arranged to store software for a standard device identification protocol for the player tracking gaming peripheral and the one or more peripheral devices, b) a memory arranged to store a plurality of device drivers for at least some of each different type of peripheral device, c) software that allows the master gaming controller to detect gaming events on the one or more peripheral devices where the gaming event is a player tracking event, d) software for a communication protocol that allows communication with the player tracking gaming peripheral via the peripheral communication connection where the communication protocol is USB and e) a plurality of different types of communication protocols allowing the gaming machine to communicate with a plurality of different types of player tracking servers. The master gaming controller may be designed or configured to send player tracking information and accounting information using the network interface to the player tracking server to receive player tracking information from the player tracking server using the network interface where the network interface is a wireless interface or a wired interface.

Another aspect of the present invention provides a method of initializing a player tracking unit on a gaming machine. The method may be generally characterized as including: 1) establishing communications with a player tracking server; 2) loading a player tracking protocol for communicating with the player tracking server from among a plurality of different player tracking protocols; 3) establishing communications with a master gaming controller on a gaming machine; 4) loading a gaming machine protocol for communicating with a master gaming controller on the gaming machine from among a plurality of different gaming machine protocols; and 5) performing one or more player tracking functions. In addition, the method may include one or more of the following: a) sending the gaming information to the player tracking server, b) determining the player tracking server type, c) determining the gaming machine type and d) determining one or more peripheral device types.

Another aspect of the present invention provides a method of designing and producing a player tracking unit for installation in a gaming machine. The method may be generally characterized as including 1) identifying one or more components to be included in the player tracking unit; 2) defining a housing for the player tracking unit, which housing is designed having dimensions conforming to dimensions specified in a standard for player tracking units in gaming machines; and 3) producing the player tracking unit having the defined housing and one or more components where the player tracking unit may be an after market unit for the gaming machine. In addition, the method may include defining an arrangement of the one or more components with respect to one another in housing, wherein the arrangement conforms to said standard for player tracking units in gaming machines.

These and other features of the present invention will be presented in more detail in the following detailed description of the invention and the associated figures.

DESCRIPTION OF THE PREFERRED EMBODIMENTS

Figure 2:
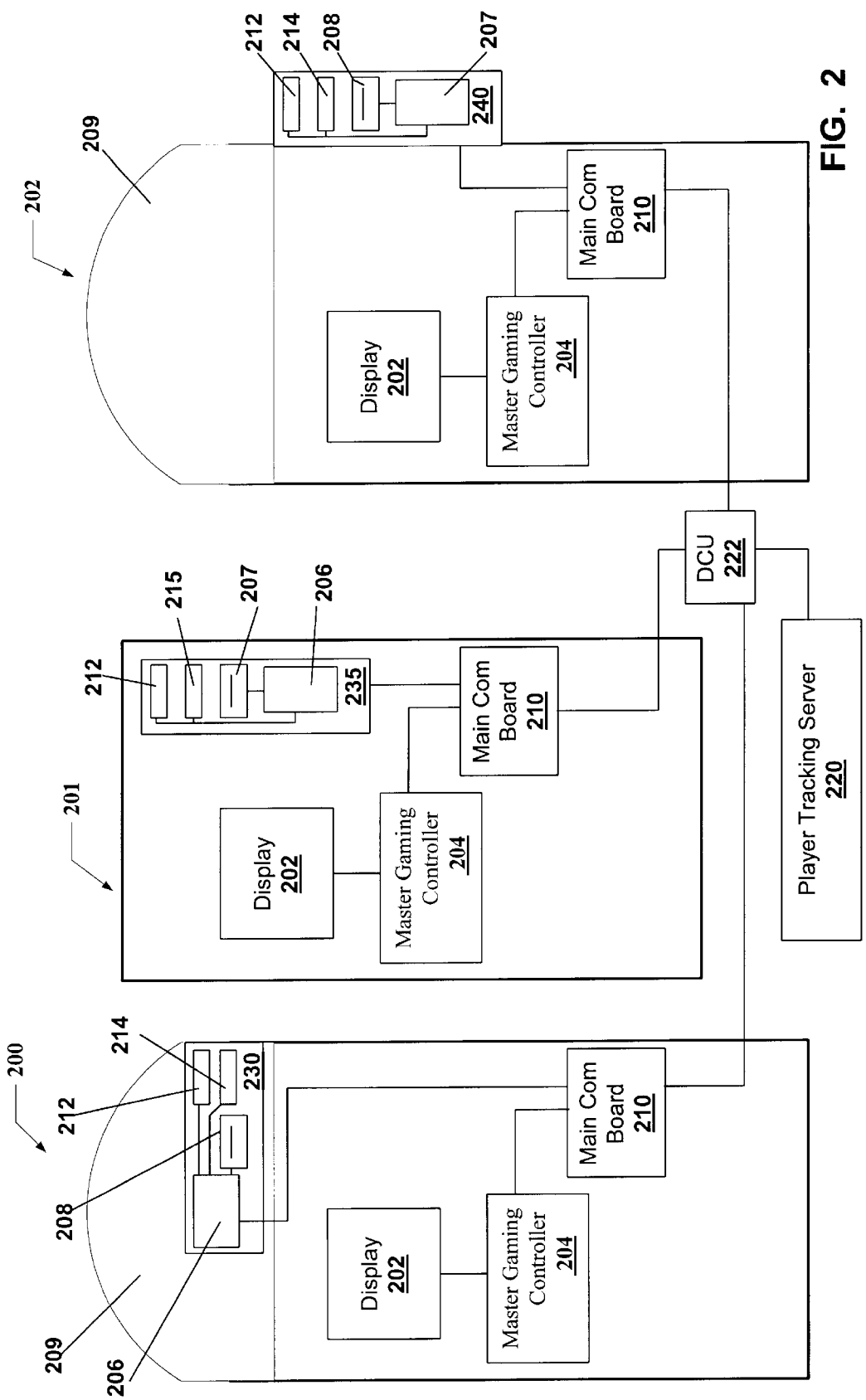
FIG. 2 is a block diagram of gaming machines with player tracking units of the present invention connected to a player tracking/accounting server.

FIG. 2 is a block diagram of gaming machines with embodiments of player tracking units of the present invention connected to a player tracking/accounting server. A player tracking unit, 230, is located within a top box 209 mounted on gaming machines. A player tracking unit 235 is located within a main cabinet of gaming machine 201. A player tracking unit 240 is mounted on a side of a main cabinet of gaming machine 202. The gaming machines 200, 201 and 202 each contain a display 202, a master gaming controller 204 and a main communication board 210. The main communication board 210 provides an interface between a SMIB 206 or a peripheral controller 207 and the master gaming controller 204. Also, the main communication board provides an interface between the SMIB 206 or the peripheral controller 207 and a data collection unit 222 connected to a player tracking/accounting server 220 which provides player tracking and accounting services to each of the gaming machines, 200, 201 and 202. The operation of the player tracking units in the context of game play on the gaming machines is described with reference to FIG. 6.

In FIG. 2, the player tracking units 230, 235 and 240 communicate with the master gaming controller 204 and the data control unit 222 connected to the player tracking server 220 via the main communication board 210. The present invention may be employed with many different connection schemes between the player tracking unit, master gaming controller, data collection unit and player tracking/accounting server and is not limited to the example shown in FIG. 2. For instance, the player tracking unit 230 may be directly connected to the master gaming controller 204 bypassing the main communication board 210. In another example, the player tracking unit 230 may be connected directly to a master gaming controller 204 and directly to a data collection unit 222 without using a main communication board 210. In addition, other data collection elements (not shown) such as a translator may be used to gather player tracking information from the gaming machines.

The master gaming controllers, 204, control one or more games played on the gaming machine that are displayed on display 202. The gaming machines that may use the player tracking units of the present invention are not limited to video gaming machines and may be used with many types of pre-existing and future gaming machines. For instance, the gaming machines may be upright gaming machines, slant top gaming machines and bar top gaming machines providing video games of chance, mechanical slot games and combinations of video and mechanical games as well as bonus games. Games that may be played on the gaming machine with a player tracking unit of the present invention include a video bingo game, a video lottery game, a video black jack game, a video slot game, a mechanical slot game, a video poker game, a video keno game and a video pachinko game. The gaming machines may or may not include top boxes. For example, the player tracking units, 230 and 240, are located within top boxes, 209, mounted on top of gaming machines 200 and 202 while the player tracking unit 235 is located within the main cabinet of gaming machine 201.

The player tracking units, 230, 235 and 240, each include three player tracking devices, a card reader 208, a display 212 and key pad 214. The card reader 208 may read or write to smart cards and/or read to magnetic striped cards. The player tracking units may incorporate other types of gaming devices such as bonus buttons, lighted displays, lights, sound devices (e.g. speakers), and biometric input devices. For instance, the biometric input device may be a finger print reader, a microphone or a retina scanner. The microphone and speakers may also be used for voice recognition applications.

The player tracking units are not limited to these gaming devices and many different combinations of player tracking devices using many different types of player tracking devices may be used with the player tracking units of the present invention. For example, on some gaming machines, the display screen 202 may be used to input player tracking information and the display 212 and key pad 214 may be eliminated. A detailed description of an embodiment of a player tracking unit using a touch screen on the gaming machine to enter player tracking information is described in co-pending U.S. patent application Ser. No. 09/642,192 entitled GAMING MACHINE VIRTUAL PLAYER TRACKING AND RELATED SERVICES, filed Aug. 18, 2000 which is incorporated herein in its entirety and for all purposes.

The device logic for performing player functions may be distributed between the player tracking unit and the master gaming controller on the gaming machine. Therefore, a logic device within the player tracking unit, such as microcontroller or a microprocessor, may execute player tracking software for some or all of player tracking functions available on the player tracking unit. Some examples of player tracking functions may include 1) communicating with a player tracking/accounting server, 2) polling a gaming machine for game usage information, 3) operating player tracking devices such as the card reader 208 and 4) sending information to the player tracking devices (e.g. displaying a message on display 212 or writing information to a smart card inserted in card reader 207). For current player tracking units, a logic device within the player tracking unit which is separate from the master gaming controller on the gaming machine, typically executes player tracking software enabling all of the player tracking functions available on the player tracking unit. Thus, when player tracking units of the present invention are installed in an older gaming machine, all of the player tracking functions may be executed by a logic device within the player tracking unit such as the SMIB 206 or the peripheral controller 207. However, on newer gaming machines or modified older gaming machines, the player tracking functions may be distributed between logic devices located on the player tracking unit, master gaming controller or even external gaming devices such as a smart card. A few embodiments of logic devices of the present invention are described with reference to FIGS. 3 and 4.

On newer gaming machines, the master gaming controller may be configured to perform some or all of the player tracking functions. For example, the gaming machines, such as 200, 201 and 202, may transmit game usage information directly to the player tracking server 220 via the main communication board 210 bypassing the player tracking units, 230, 235 and 240. In this example, the player tracking unit may disable polling capabilities available on the player tracking unit when this player tracking function is performed by the master gaming controller on the gaming machine. In one embodiment, when the player tracking unit is initialized, it may automatically configure itself with a particular set of player tracking functions after contacting the master gaming controller on the gaming machine and/or a remote server such as a player tracking/accounting server. In another embodiment, the player tracking unit may configure itself by reading a configuration file stored in a memory location on the player tracking unit. The player tracking unit may also be configured by a gaming machine operator. When all of the player functions are performed by the master gaming controller 204, the player tracking devices such as the card reader 208, the display 212 and the key pad 214 may be operated in a manner similar to other gaming devices connected to a gaming machine such as bill validators, lights, input buttons, displays, etc.

For the player tracking units 230, 235 and 240, a logic device in each player tracking unit may be configured to perform a number of player tracking functions. For instance, the SMIBs, 206, which contain a logic device, may allow the player tracking units to collect player tracking information from the player tracking peripheral devices (e.g. the card reader 208, the display 212, and the key pad 214), 2) collect gaming information such as game usage information from a master gaming controller on the gaming machine, 3) to send player tracking player tracking information to a remote player tracking/accounting server (e.g. 220) and 4) sending information to the player tracking devices (e.g. displaying a message on display 212 or writing information to a smart card inserted in card reader 207). Further, each player tracking unit may contain a memory arranged to store a) a plurality of different communication protocols for communicating with master gaming controllers on different types of gaming machines, b) a plurality of different communication protocols to communicate with different types of player tracking/accounting servers and c) a plurality of different device drivers allowing logic device to communicate with various types of player tracking devices as well as to operate these devices.

As an example, a memory on the player tracking units (e.g. 230, 235 and 240) may store or may be easily updated to store a first communication protocol for a first type of player tracking server manufactured IGT (Reno, Nev.), a second communication protocol for a second type of player tracking server manufactured by Bally Gaming systems (Las Vegas, Nev.) and a third communication protocol for a third type of player tracking server manufactured by Acres gaming (Las Vegas, Nev.). Thus, in this example, the player tracking units, 230, 235, 240, of the present invention, may be configured to communicate with the three types of player tracking servers above, as well as many other types of player tracking servers without replacing the player tracking hardware. Therefore, a player tracking unit with a memory storing communication protocols for different types of gaming machines may be installed in a gaming machine in a first casino using a first type of player tracking server or in a gaming machine in a second casino using a second type of player tracking server. An advantage of player tracking units that may communicate with many types of player tracking servers is that a gaming machine operator, maintaining a number of gaming machines connected to a particular type of player tracking server, may change the type of player tracking server by reconfiguring software on each of the player tracking units and avoid replacing all of the player tracking hardware units in each gaming machine.

As another example, a memory on the player tracking units (e.g. 230, 235 and 240) may store or may be easily updated to store communication protocols allowing the player tracking to communicate with master gaming controllers on a number of different types of gaming machines such as gaming machine manufactured by IGT, Bally gaming systems and Acres gaming. Thus, each player tracking units may be configured to operate with a particular type of gaming machines by loading a communication protocol from the memory allowing the player tracking unit to communicate with the master gaming controller of the particular type of gaming machine. In addition to changing the communication protocol software to install the player tracking unit in different types of gaming machines, connection hardware, such as cabling and pin connectors, in the player tracking unit may have to be modified to enable communications between the master gaming controller and the player tracking units. In some embodiments of the present invention, a standard communication connection and communication is employed in the player tracking unit to simplify the connection process. An example of a standard connection scheme and communication protocol for a gaming machine such as USB is described U.S. patent application Ser. No. 09/414,659 entitled STANDARD PERIPHERAL COMMUNICATION, filed Oct. 6, 1999 which is incorporated in its entirety and for all purposes. In addition, some details of a standard connection scheme and standard communication protocol are described with respect to FIG. 4.

In one embodiment of the present invention, generic application program interfaces (API) necessary for a player tracking server, such as 220, to communicate and operate with a player tracking unit, such as 230, 235 and 240 or other gaming devices performing player tracking functions to communicate and operate with one another may be used. API's let application programmers use functions of a computer and an operating system without having to directly keep track of all the details in the CPU's operation. Typically, the API's describe all of key transactions and associated processing necessary to perform a particular function. For example, player tracking functions such as polling of gaming machine for accounting information may be described as part of one or more generic player tracking APIs. An API may be considered analogous to a device driver in that it provides a way for an application to use a hardware subsystem without having to know every detail of the hardware's operation.

A generic mark-up language may be used to describe player tracking APIs and player tracking transaction definitions involving two or more of the logic devices in a gaming system performing player tracking functions. For instance, logic devices used to perform player tracking functions in the gaming system may be located in the player tracking unit (e.g. 230, 235, 240), in the master gaming controller of a gaming machine (e.g. 204), in the player tracking server (e.g. 204) as well as in associated peripheral devices such as but not limited to a card reader (e.g. 208), a personal digital assistant, a cell phone or a smart card. A mark-up language may be used to describe each transaction to and from the player tracking unit and to and from the player tracking server according to the API's for each device. Further, the mark-up language may be extended to describe transactions between a plurality of logic devices performing player tracking functions according to the API's for each logic device such as but not limited to between: 1) a smart card and a player tracking server, 2) a smart card and a player tracking unit, 3) a personal digital assistant and player tracking server, 4) a personal digital assistant and player tracking unit, 5) a master gaming controller and a player tracking unit, 6) a master gaming controller and a player tracking server, etc.

In general, a mark-up language may be used to add instructions to information content that tells a device receiving the information content what to do with the information content. For example, the mark-up language may specify a format for displaying information content when it is received by a gaming device. Hyper text mark-up language (HTML) is one example of a mark-up language. Other examples of mark-up languages that may be used with the present invention, include but are not limited to XML (extensible markup language), Wireless Mark-up Language (WML), and hand-held device markup language (HDML). Multiple mark-up languages may be used in a gaming system to define different player tracking APIs. For instance, XML may be used to communicate with certain gaming devices, such as player tracking units, while HDML may be used to communicate with other gaming devices such as personal digital assistants or other hand held devices.

An advantage of using a mark-up language to describe one or more player tracking application program interfaces is that it may allow outside vendors to develop player tracking software. In the past, player tracking software and player tracking protocols have been typically kept proprietary. The proprietary nature of the software and protocols makes it difficult for outside software vendors to develop player tracking applications.

In one embodiment of the present invention, portions of the player tracking software may designed to be executed on different types of logic devices performing player tracking functions. For example, the player tracking software may include but is not limited to an operating system, one or more application program interfaces, one or more player tracking communication protocols and a plurality of player tracking applications. The player tracking software may designed to allow a player tracking unit such as 230 or 235 or the master gaming controller 204 to execute an essentially identical set of player tracking software components including the operating system, communication protocols, application program interfaces and player tracking applications. All of the player tracking software components do not have to be compatible with a plurality of different logic devices. Some of the player tracking software components may be logic device specific. For instance, in some embodiments, two different logic devices performing player tracking functions such as a logic device on the player tracking unit 230 and the master gaming controller 204 may execute the same player tracking software applications using two different operating systems.

Traditionally, the communication between the player tracking unit and the master gaming controller has been to allow the player tracking unit to poll the master gaming controller for game usage information and to receive game usage information from the master gaming controller. However, in the past, the master gaming controller has not operated player tracking devices in the player tracking unit such as the card reader 208, the display 212 and the key pad 214. In the present invention, the communication interface between the master gaming controller and the player tracking unit may be configured to allow the master gaming controller to operate one or more of the player tracking devices. An advantage of this configuration is that the player tracking devices may be utilized to provide gaming services other than player tracking gaming services. For instance, the card reader 208 may be used with a magnetic striped card or a smart card as part of a cashless award system, to configure a gaming machine according to a player's preferences or as part of a bonusing system.

As another example, a memory within the player tracking units, such as 230, 235 and 240, may also store a plurality of device drivers for different types of player tracking devices. For instance, device drivers for a plurality of card readers may be stored within the player tracking unit so that one type of card reader may be exchanged for another type of card reader in the player tracking unit with minimal modifications to the player tracking unit. A card reader may be replaced in the player tracking unit for a number of reasons such as for maintenance purposes (e.g. to replace a damaged card reader) or to upgrade the card reader.

The one or more memories within the player tracking units storing communication protocols and device drivers may be configured to allow additional communication protocols and device drivers to be added or modified. For example, the player tracking unit may contain a CD/DVD drive that reads a CD/DVD containing many different communication protocols and many different device drives. Thus, the communication protocols and device drivers may be modified by exchanging the CD/DVD within the drive. In another example, the memory may be a hard drive of some type containing the communication protocols and the device drivers. The communication protocols and device drivers on the hard drive may be updated via a communication interface of some type. For instance, a smart card inserted into a smart card reader in player tracking unit might be used to download new communication protocols and device drivers into the memory. As another example, new communication protocols and device drivers may be downloaded into the memory from the master gaming controller on the gaming machine.

Figure 1:
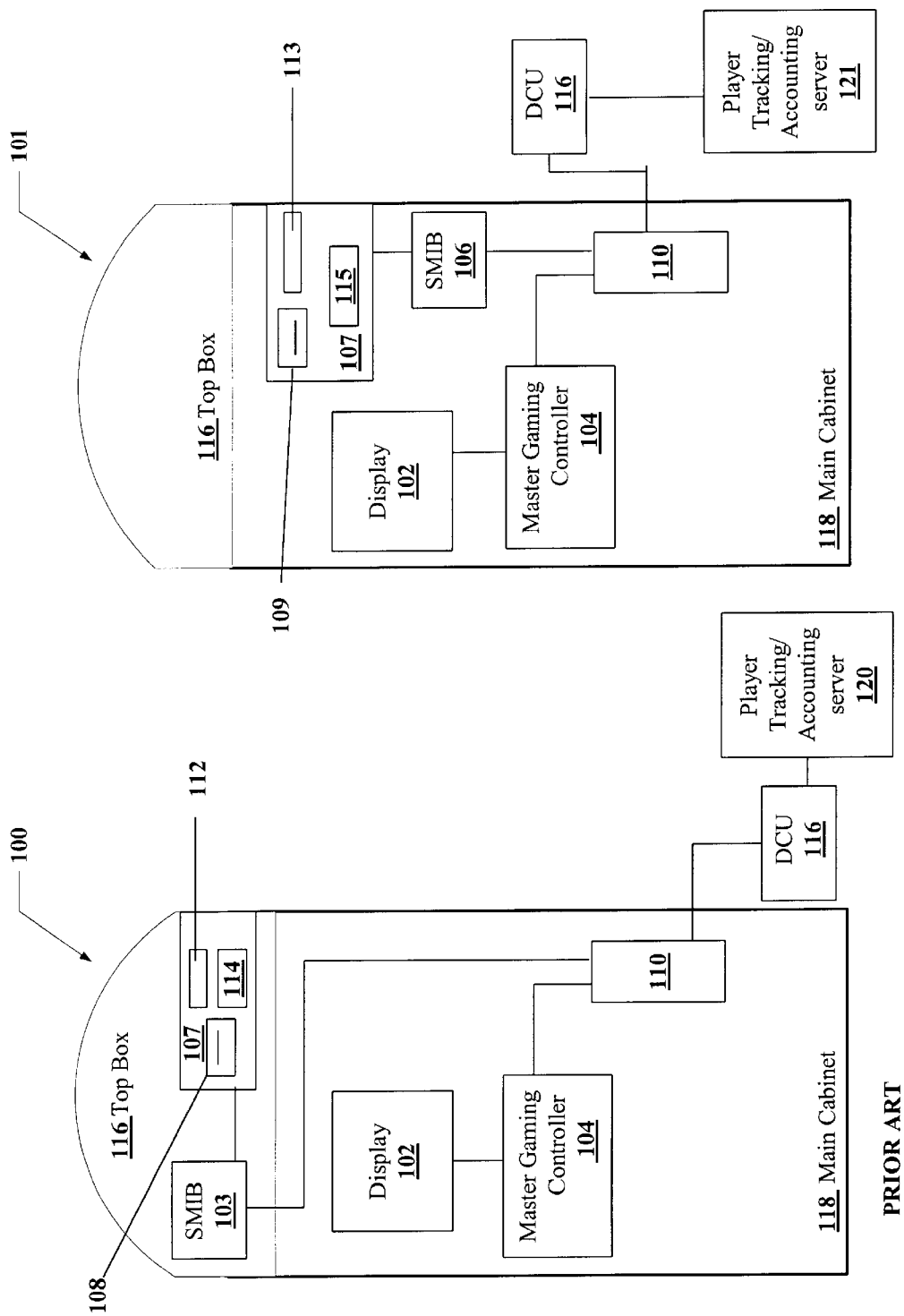
FIG. 1 is a block diagram of gaming machines with player tracking units connected to two servers providing player tracking/accounting services.

For the player tracking units 230, 235 and 240, logic devices for the player tracking units, such as the SMIB 206 and the peripheral controller 207, are located within a device chassis or device housing which encloses the player tracking devices including the card reader 208, the display 212 and the key pad 214. As described with reference to FIG. 1, the logic devices may be located within a separate logic device housing which is mounted separately from the device housing containing the player tracking devices including the card reader 208, the display 212 and the key pad 214. The logic device housing and the device housing may be configured with standard dimensions that allow the housings to be installed in many different types of gaming machines. In addition, the device housing dimensions and player tracking device dimensions may be selected such that the same device housing and player tracking devices may be used for a vertical or horizontal mounting of the player tracking units. For instance, player tracking unit 230 and 235 may utilize the substantially similar device housing and player tracking devices. An advantage of using device housing and player tracking devices conforming to standard dimensions is that manufacturing and installation costs for the player tracking units may be decreased. Another advantage is that the design of the gaming machine such as the packaging of the game components may be simplified when standard dimensions are used. Details of the device housing dimensions and device layouts are described with reference to FIGS. 5A, 5B, 5C and 5D.

Figure 3:
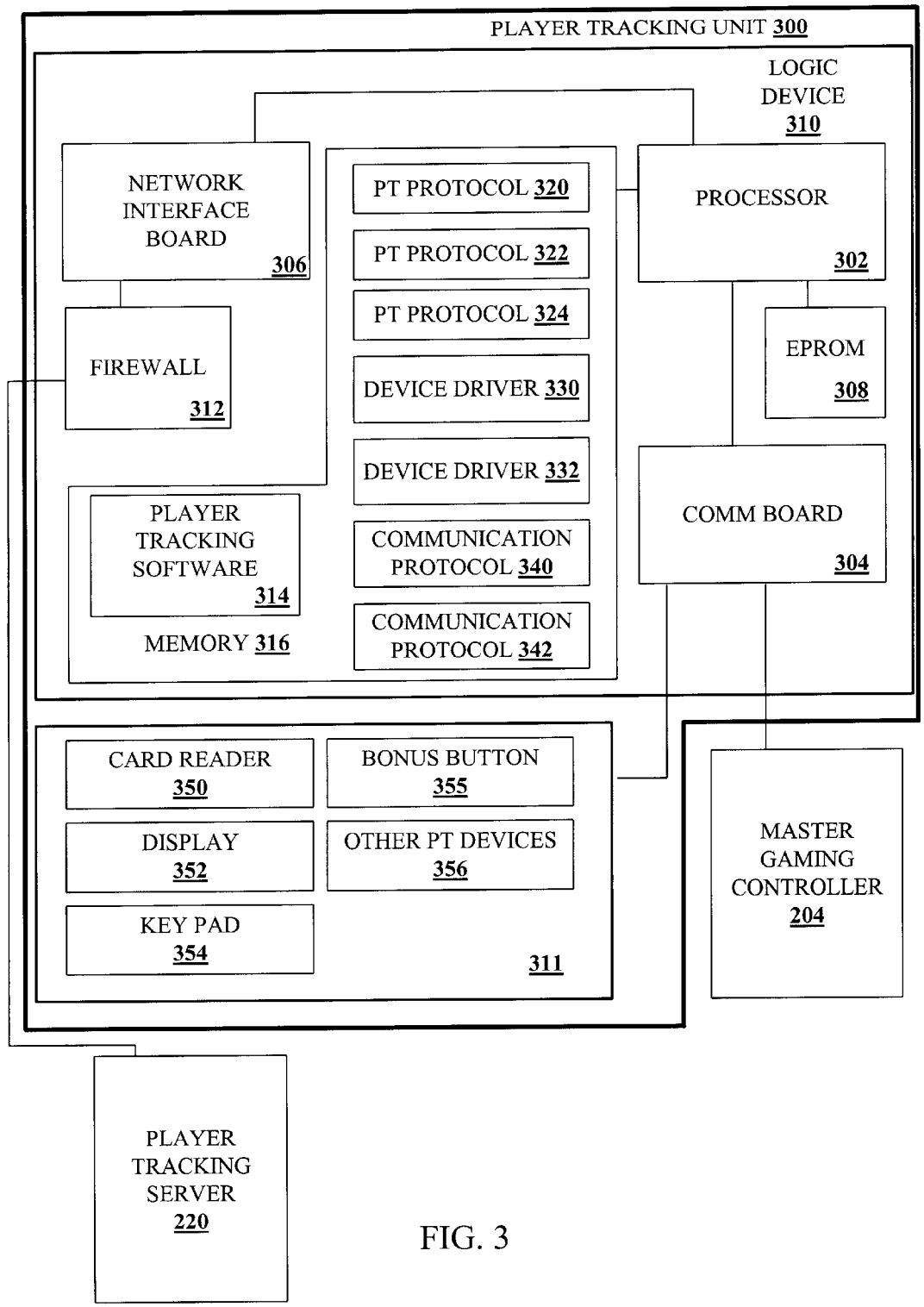
FIG. 3 is a block diagram of player tracking unit of the present invention connected to a master gaming controller on a gaming machine and a player tracking server.

FIG. 3 is a block diagram of an embodiment of a player tracking unit 300 of the present invention connected to a master gaming controller 204 on a gaming machine and a player tracking server 220. The present invention is not limited to the player tracking network shown in the FIG. 3 and other possible elements of a player tracking network such as a data collection units (See FIG. 2) and translators may also be used. The player tracking unit includes a logic device 310 enclosed in a logic device housing and a number of player tracking devices including a card reader 350, a display 352, a key pad 354 and other player tracking devices 356 enclosed in a device housing 311. As described above, the logic device 310 for the player tracking unit and the player tracking devices may be enclosed in a single housing (see FIGS. 5A–5D) or separate housings.

The logic device 310 may include a processor for executing software allowing the player tracking unit to perform various player tracking functions such as communicating with the player tracking server 220, communicating with the master gaming controller 204 or operating the various peripheral devices such as the card reader 350, the display 352, the key pad 354 and the bonus button 355. For instance, the logic device 310 may send messages containing player tracking information to the display 352. The logic device 310 may utilize a microprocessor or a microcontroller. In one embodiment, application software for the player tracking unit 300 and configuration information for the player tracking unit may be stored in a memory device such as an EPROM 308, a non-volatile memory, hard drive or a flash memory.

The player tracking unit may include a memory 316 configured to store: 1) player tracking software 314 such as data collection software, 2) player tracking protocols (e.g. 320, 322, 324) allowing the player tracking unit 300 to communicate with different types of player tracking servers, 3) device drivers for many types of player tracking devices (e.g. 330 and 332) and 4) communication protocols (e.g. 340 and 342) such as TCP/IP allowing the player tracking unit to communicate with devices using these protocols or communication protocols allowing the logic device to communicate with different types of master gaming controllers (e.g. master gaming controllers using different types of communication protocols), such as 204. Typically, the master gaming controller, such as 204, communicates using a serial communication protocol. A few examples of serial communication protocols that may be used to communicate with the master gaming controller include but are not limited to USB, RS-232 and Netplex (a proprietary protocol developed by IGT, Reno, Nev.).

A plurality of device drivers may be stored in memory 316 for each type of player tracking device. For example, device drivers for five different types of card readers, six different types of displays and 8 different types of key pads may be stored in the memory 316. When one type of a particular peripheral device is exchanged for another type of the particular device, a new device driver may be loaded from the memory 316 by the processor 302 to allow communication with the device. For instance, one type of card reader in the player tracking unit 300 may be replaced with a second type of card reader where device drivers for both card readers are stored in the memory 316.

In some embodiments, the software units stored in the memory 316 may be upgraded as needed. For instance, when the memory 316 is a hard drive, new device drivers or new communication protocols may be uploaded to the memory from the master gaming controller 204, the player tracking server 220 or from some other external device. As another example, when the memory 316 is a CD/DVD drive containing a CD/DVD designed or configured to store the player tracking software 314, the device drivers and other communication protocols, the software stored in the memory may be upgraded by replacing a first CD/DVD with a second CD/DVD. In yet another example, when the memory 316 uses one or more flash memory units designed or configured to store the player tracking software 314, the device drivers and other communication protocols, the software stored in the flash memory units may be upgraded by replacing one or more flash memory units with new flash memory units storing the upgraded software.

In one embodiment of the present invention, a minimal set of player tracking software applications 314, communication protocols 340, player tracking communication protocols and device drivers may be stored on in the memory 316. For instance, an operating system, a communication protocol allowing the player tracking unit 300 to communicate with a remote server such as the player tracking server 220 and one or more common player tracking applications may be stored in memory 316. When the player tracking unit is powered-up, the player tracking unit 300 may contact a remote server 220 and download specific player tracking software from the remote software. The downloaded software may include but is not limited to one or more particular player tracking applications that are supported by the remote server, particular device drivers, player tracking software upgrades, and a particular communication protocol supported by the remote server. A method of downloading player tracking software from a remote server to a player tracking unit is described in more detail with respect to FIG. 9.

As described with reference to FIG. 2, in some embodiments, the player tracking functions may be implemented by both the logic device 310 and the master gaming controller 204. Thus, player tracking software such as the player tracking protocols may be stored on a memory located on the gaming machine which is separate from the player tracking unit. In some embodiments, the player tracking software stored on the memory on the gaming machine may be executed by the master gaming controller 204 on the gaming machine in other embodiments, the player tracking software stored on the memory on the gaming machine may be executed by the logic device 310 on the player tracking unit.

The logic device 310 includes a network interface board 306 configured or designed to allow communication between the player tracking unit 300 and other remote devices such as the player tracking server residing on local area networks such as a casino area network or a wide area network such as the Internet. The network interface board 306 may allow wireless or wired communication with the remote devices. The network interface board may be connected to a firewall 312. The firewall may be hardware, software or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The communication board 304 may be configured to allow communication between the logic device 310 and the player tracking devices including 350, 352, 354, 355 and 356 and to allow communication between the logic device 310 and the master gaming controller 204. The communication between the player tracking unit 300 and 1) the player tracking devices, 2) the master gaming controller 204, 3) the player tracking server 220 and 4) any other external or internal gaming devices may be encrypted. In one embodiment, the logic device 310 may poll the player tracking devices for information. For instance, the logic device 310 may poll the card reader 350 to determine when a card has been inserted into the card reader or may poll the bonus button to determine when the bonus button 355 has been depressed. In some embodiments, the player tracking devices may contact the logic device 310 when a player tracking event such as a card being inserted into the card reader has occurred.

The logic device 310 may poll the master gaming controller 204 for game usage information. For instance, the logic device may send a message to the master gaming controller 204 such as "coin-in". The master gaming controller may respond to the "coin-in" message with an amount when credits are registered on the gaming machine.

The logic device 310, using an appropriate device driver, may send instructions to the various player tracking devices to perform specific operations. For instance, after a card has been inserted into the card reader 352, the processor logic device may send a "read card" instruction to the card reader and a "display message A" instruction to the display 352. In addition, the logic device 310 may be configured to allow the master gaming controller 204 to send instructions to the player tracking devices via the logic device 310. As an example, after a card has been inserted into the card reader 352, the processor logic 310 may determine that the card is for a gaming application controlled by the master gaming controller 204 and send a message to the master gaming controller 204 indicating a card has been inserted into the card reader. In response, to the message from the logic device, the master gaming controller 204 may send a series of commands to the player tracking devices such as a "read card" instruction to the card reader 350 and a "display message" instruction to the display 352 via the logic device 310. The instructions from the master gaming controller to the player tracking devices may be obtained from gaming application software executed by the master gaming controller 204. The gaming application software may or may not be related to player tracking services.

The player tracking unit 300 may include one or more standard peripheral communication connections (not shown). These connections are described in more detail with respect to FIG. 4. The logic device 310 may be designed or configured to communicate with the master gaming controller 204 using a standard peripheral connection using a standard communication protocol such as USB. The USB standard allows for a number of standard USB connectors that may be used with the present invention. The player tracking unit 300 may contain a hub (see FIG. 4) connected to the peripheral communication connection and containing a plurality of peripheral communication connections.

Figure 4:
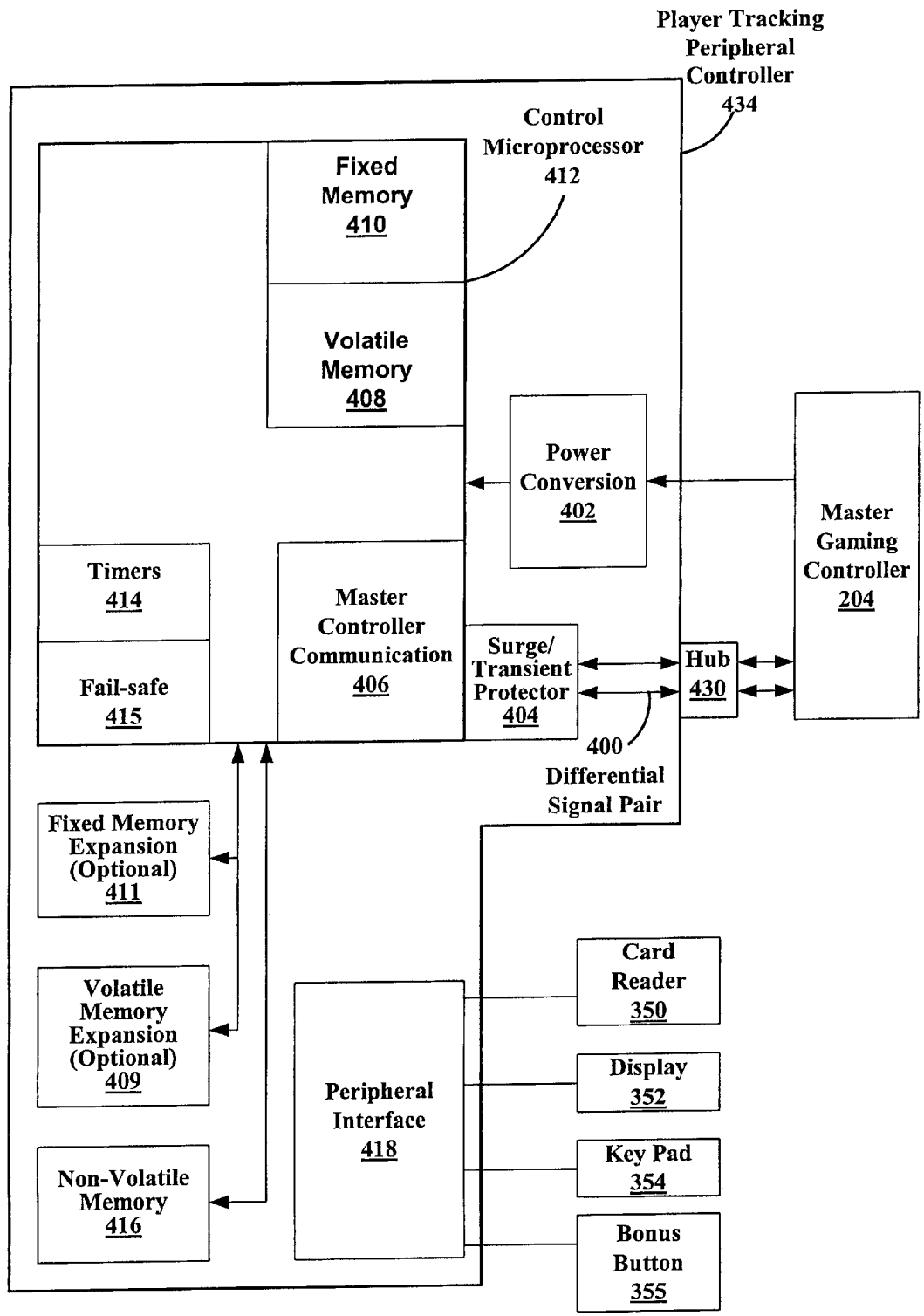
FIG. 4 is a block diagram of a player tracking peripheral controller connected to a master gaming controller on a gaming machine and a plurality of player tracking devices.

FIG. 4 is a block diagram of a player tracking peripheral controller 434 connected to a master gaming controller 204 on a gaming machine and connected to a plurality of player tracking devices for one embodiment of the present invention. The peripheral controller 434 is one embodiment of a logic device that allows the master gaming controller to operate the player tracking peripheral devices such as the card reader 350, the display 352, the key pad 354 and the bonus button 355. In one embodiment, the peripheral controller 434 may be integrated into the logic device 310, as described with reference to FIG. 3. The peripheral controller 434 may be enclosed in a standard housing as described with reference to FIGS. 5A–5D.

The master gaming controller 204 is connected to the hub 430, which includes standard communication connections on the gaming peripheral. The peripheral controller 434 is connected to the hub 430 using a peripheral connection 400. The peripheral connection 400 is connected to a transient and surge protector 404. The transient and surge protector 404 protects the peripheral controller from signals arriving on the peripheral connections, which might damage a logic device such as a control microprocessor 412.

Power from the master gaming controller 204 is transmitted to a power conversion unit 402. The power conversion unit 402 converts the voltage arriving from the master gaming controller 204 to voltages needed for the control microprocessor 412 of the peripheral controller 434 or any of the peripheral devices connected to the peripheral controller 434 including but not limited to the card reader 350, the display 352, the key pad 354 or the bonus button 355. The peripheral devices may also receive power directly from the power supply unit (not shown) with or without using the power conversion unit 402. The power supply unit is usually contained within the main cabinet of the gaming machine.

Hardware needed to connect the peripheral controller 434 to a specific peripheral device is located in the peripheral interface 418. At least one or more peripheral devices are connected to the peripheral interface 418. These peripheral devices may include various player tracking devices such as the card reader 350, the display 352, the key pad 354, bonus button 355 and biometric devices (not shown). The configuration of the peripheral controller 434, which includes information about the types of peripheral devices controlled by the peripheral controller 434, may be stored in a non-volatile memory 416. When the peripheral devices on a gaming peripheral are changed, the non-volatile memory 416 can be replaced or reprogrammed to incorporate the new configuration.

The peripheral controller contains a control microprocessor 412 that controls communication with the master gaming controller 200. Further, the control microprocessor 412 may convert high-level instructions from the master gaming controller 204 requesting specific operations from the peripheral devices controlled by the peripheral controller 434 to low-level instructions needed to perform the operation. The low-level instructions required to operate a specific peripheral device may be stored in device drivers stored in a memory on the peripheral controller 434. In another embodiment, the master gaming controller may send low-level instructions directly to the player tracking peripheral devices. The control microprocessor 412 includes a fixed memory 410, a volatile memory 408, a timer 414, a fail-safe 415, and a master controller communication 406. In other embodiments, either the fixed memory 410 or the volatile memory 408 or both may be located outside of the control microprocessor.

The volatile memory 408 and fixed memory 410 may be upgraded using the volatile memory expansion 409 and the fixed memory expansion 411. The fixed memory expansion 411 might be in the form of an EPROM or flash memory. When flash memory is used, it may be possible to field upgrade the operating code of the peripheral controller. The volatile memory expansion 409 might be in the form of static RAM, which uses a long-life battery to protect the memory contents when power is removed.

Within the control microprocessor 412, the master controller communication 406 controls the communication between the peripheral controller 434 and the master gaming controller 204. The control microprocessor may be an off-the-shelf device including an Infineon Technologies AG (Munich, Germany) C541U family of microcontrollers. The master controller communication 406 performs the communication using a standard communication protocol. Essentially, it implements the protocol associated with a standard communications protocol such as USB, IEEE1394, or the like. The master gaming controller 204 stores software allowing it to communicate in the standard communication protocol used by the peripheral controller 434. The timer 414 sends signals to the control microprocessor 412, which controls execution of code. The fail-safe 415 contains code, which is independent of the code in the control microprocessor 412. When code within the control microprocessor 412 is lost or malfunctions, the fail safe 415 will reset the entire gaming peripheral. As an example, the fail safe 415 might expect a message from the control microprocessor 412, which includes "do not reset." When the fail safe 415 receives this message, the fail safe 415 will wait a specified interval for the next "do not reset" message. When the fail safe 415 does not receive a message including "do not reset" after a specified interval, the fail safe 415 resets the gaming peripheral.

The fixed memory 410 is a read only memory, which is not lost when the control microprocessor 412 loses power. The fixed memory 410 stores general code that the control microprocessor 412 uses while operating. To control a specific peripheral device, the control microprocessor 412 uses code stored in the fixed memory 410 in conjunction with peripheral device specific information stored in the non-volatile memory 416. The volatile memory 408 stores code, parameters, data from the peripheral devices and data from the master gaming controller 204 that the control microprocessor 412 needs to operate. The data in volatile memory 408 is lost when the control microprocessor 412 loses power. Critical information including the current state of player tracking peripheral devices (state history information) is stored in the non-volatile memory 416. The non-volatile memory might be an EPROM, flash card memory or a battery powered RAM. In the event of a power failure or some other malfunction, the information in non-volatile memory 416 is used to restore the gaming peripheral to its state before the malfunction occurred. For example, when a player enters cash into the gaming machine, this information can be stored in nonvolatile memory 416 on the peripheral controller 434. After this information is stored in non-volatile memory, it will be available to determine the state of the machine when any subsequent malfunctions occur.

To communicate with the peripheral controller 434, the master gaming controller 204 may include a memory (not shown) arranged to store software for a standard device identification protocol for a player tracking gaming peripheral including the peripheral controller 434. The device identification protocol may also be used for the peripheral devices connected to the player tracking gaming peripheral. The master gaming controller 204 may include a memory arranged to store a plurality of device drivers for at least some of each different type of player tracking peripheral device. The master gaming controller 204 may include a memory arranged to store software that allows the master gaming controller to detect gaming events such as "card-in" or "button depressed" on the one or more peripheral devices. The master gaming controller 204 may include a memory allowing it to send high-level or low-level instructions to the peripheral controller 434 for operating a particular player tracking device. In addition, the master gaming controller 204 may include a memory arranged to store a plurality of different types of communication protocols allowing the gaming machine to communicate with a plurality of different types of player tracking servers using different communication protocols.

Figure 5A:
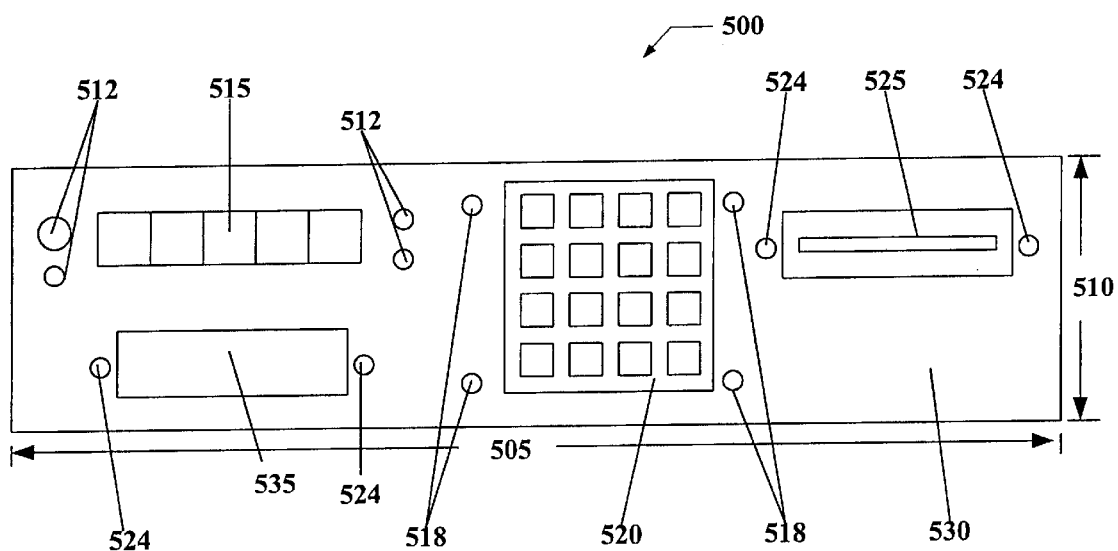
FIGS. 5A–C are front and perspective diagrams of a player tracking unit of the present invention.
Figure 5B:
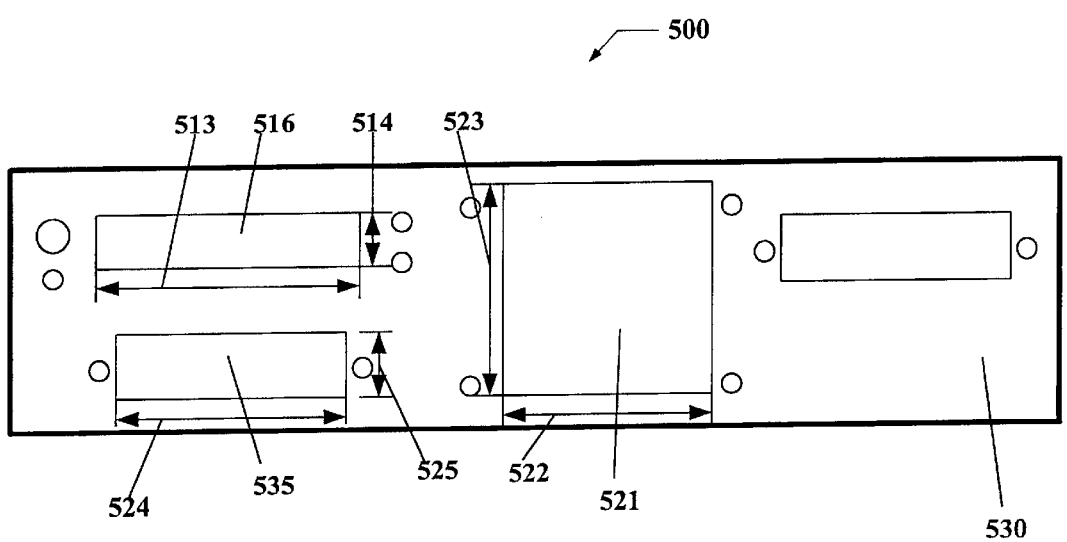
Figure 5C:
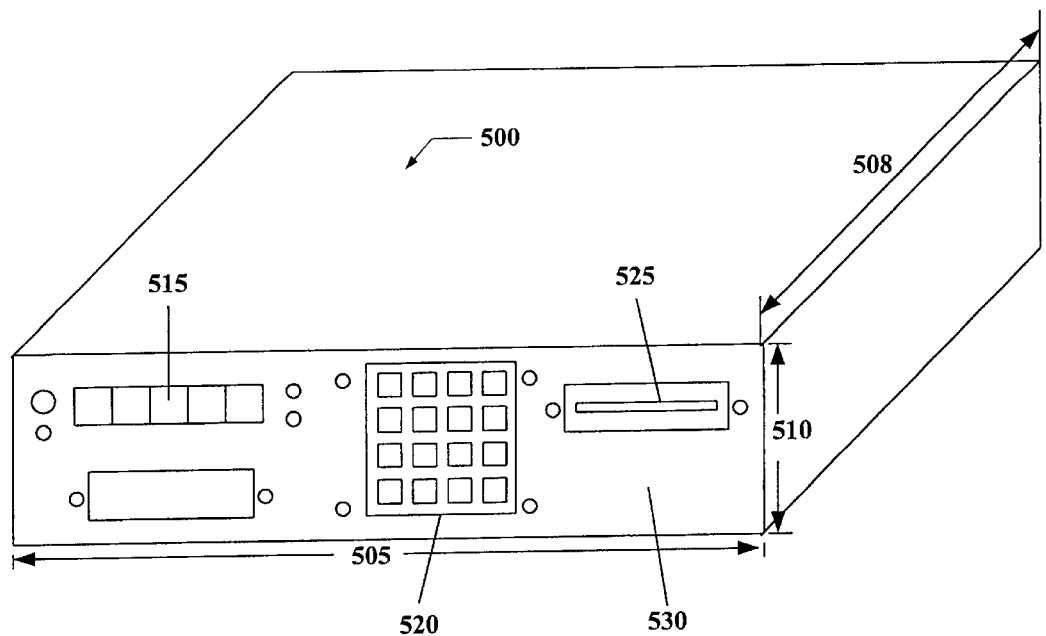

FIGS. 5A–C are front and perspective diagrams of a player tracking unit of the present invention. FIG. 5A is a front diagram for a housing or chassis 500 enclosing three player tracking devices for one embodiment of the present invention. As described with reference to FIG. 2, the device housing 500 may enclose a logic device configured to execute player tracking functions or the logic device may be enclosed in a logic device housing separate from the device housing 500.

The device housing 500 encloses a display 515, a key pad 520 and a card reader 525. In other embodiments, the housing 500 may enclose many different combinations of player tracking devices. For instance, additional gaming devices, such as biometric devices and bonus buttons, may also be enclosed in the device housing. The display 515, key pad 520 and card reader 525 are mounted within a face plate 530. The face plate includes 1) four mounting holes 512 for the display, 2) four mounting holes for the key pad 518 and 3) two mounting holes for the card reader 525. In addition, a card reader cut-out 535 and mounting holes 524 is included to allow an alternative placement of the card reader.

The dimensions of the device housing 500, (e.g. 505, 508 and 510) are shown in FIGS. 5A and 5C. The device housing 500 is shown as a rectangular box for illustrative purposes only. A shape of the device housing 500 is variable and is not strictly limited to rectangular shapes. Dimensions of the display reader cut-out 516 (e.g. 513 and 514), the card reader cut-out (e.g. 524 and 525) and the key pad cut-out (e.g. 522 and 523) in the face plate 530 are shown in FIG. 5B.

The dimensions and layout of the device housing may be designed to conform to one or more standards to produce a standard device housing. A few examples of these standards are described for illustrative purposes and are not meant to be limiting. For instance, to simplify the packaging of the gaming machine, the shape of the device housing may be constrained to fit within the rectangular dimensions 505, 508 and 510 specifying the rectangular device housing 500. Thus, the shape of the device housing may vary but may not exceed the specified standard dimensions. As another example, the dimensions of the cut-outs for the various player tracking devices and a size, shape and number of the mounting holes for each device may be standardized. An advantage of this standard is that one particular type of particular player tracking device may be exchanged for another particular type of player tracking device such as exchanging one brand of card reader for another brand of card reader. As yet another example, the layout of the device housing may be standardized. For instance, all device housing that are mounted horizontally may use a face plate with cut-outs and mounting holes in a fixed relation to one another such as face plate 530. A standard face plate layout may simplify the design of decorative plates for each gaming machine. As yet another example, a standard connection scheme such as USB may be used for the device housing 500 for communicating with a master gaming controller on a gaming machine. The standards described above relating to dimensions and layout may also apply to the design of logic device housings (not shown) to produce standard logic device housings.

Figure 5D:
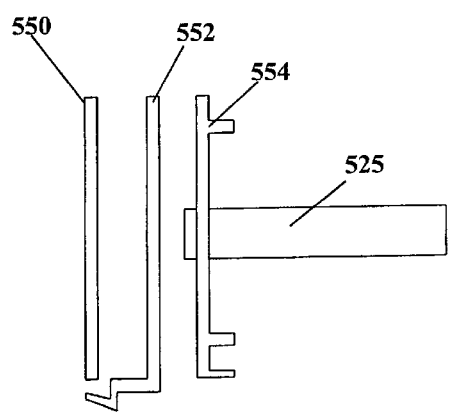
FIG. 5D is a mounting system for attaching a card reader to a player tracking unit of the present invention.

FIG. 5D is a mounting system for attaching a card reader 525 to a device housing 500 of the present invention. The card reader 525 is attached to the mount 554 which is secured with a decorative plate 552 to a decorative plate 550 of LEXAN™ polycarbonate plastic material. Typically, the decorative plate 550 is silk-screened to add a particular graphic design. The attachment means for the card reader 525 may be standardized so that a single attachment means design may be used with many different types of card readers. Attachment means (not shown) are also used to secure the other player tracking devices, such as the display 515 and the key pad 520 to the device housing 500. The attachment means for each of the other player tracking devices may be standardized so that a single attachment means design, specific to each type of player tracking device, may be used to secure many different types of each particular player device. A standard attachment means (not shown) may be also employed on the device housing 500 to secure the device housing 500 to a gaming machine. The attachment means for mounting the device housing to the gaming machine may be a standard design (e.g. number and size of mounting holes, size of the mounting bracket) and may be located at a standard location on each device housing.

In the present invention, a design of a device housings, a design of an attachment means such as a bracket to secure the device housing to a gaming machine or a design of a gaming machine may be simplified accessing specifications for player tracking units and player tracking devices for the many different manufacturers of these devices in compiled in a database or some other suitable format. The database may be consulted by a designer to design a particular part on the player tracking unit or the gaming machine. As an example, a designer may consult the database to determine dimensions and mounting requirements for one or more brands of player tracking unit when packaging a gaming machine. In designing a gaming machine to accommodate different types of player tracking units gathering the specifications for each type of player tracking is very time consuming and may be minimized using a player tracking unit design database. In another example, a designer of a player tracking unit may consult the player tracking design database to determine housing dimensions for a player tracking unit designed for a particular type of gaming machine.

Figure 6:
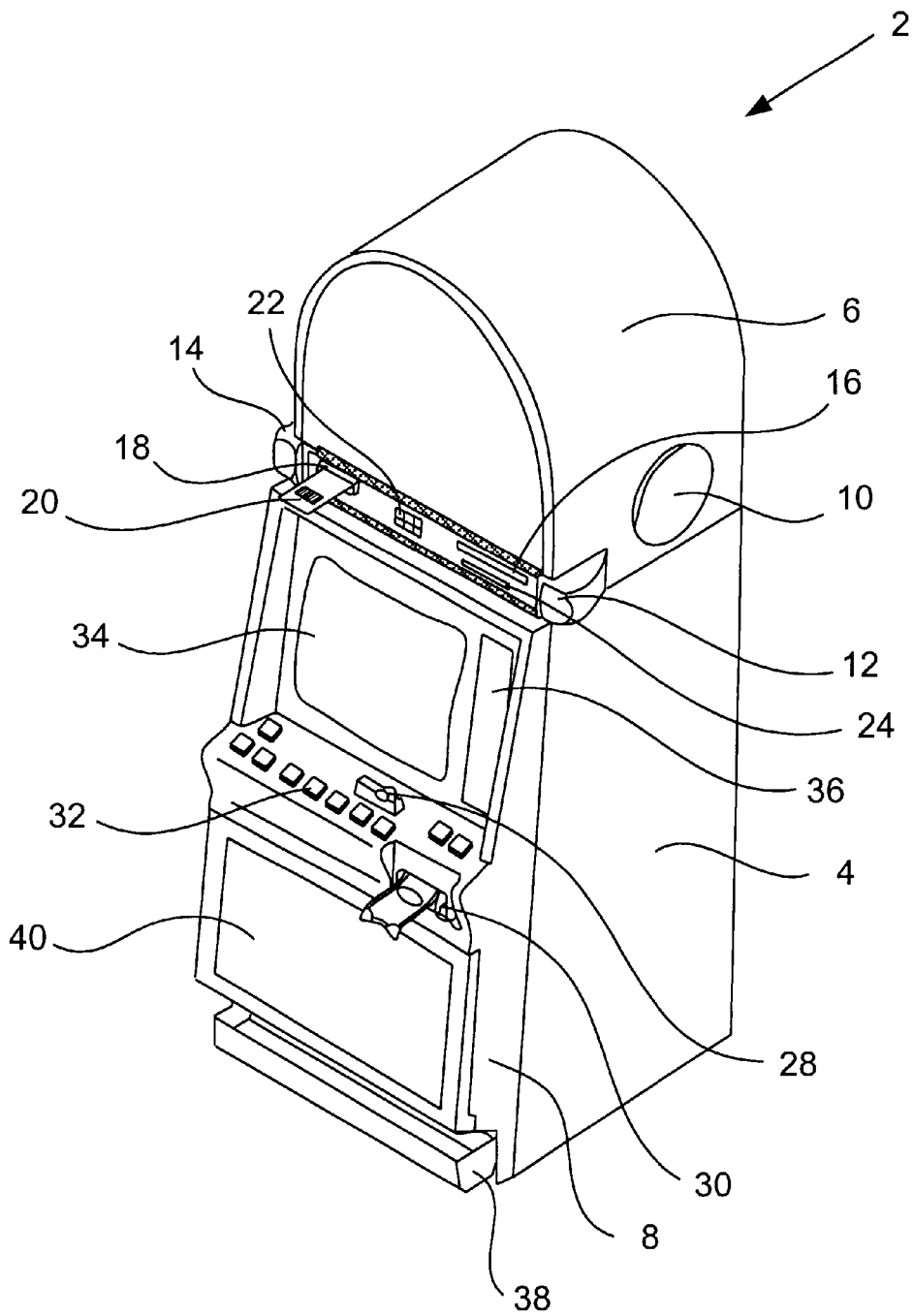
FIG. 6 is perspective drawing of a gaming machine with a player tracking unit of the present invention.

Turning to FIG. 6, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. The bill validator 30, player-input switches 32, video display monitor 34, and information panel are devices used to play a game on the game machine 2. The devices are controlled by circuitry (see FIG. 2) housed inside the main cabinet 4 of the machine 2. Many possible games, including traditional slot games, video slot games, video poker, and keno, may be provided with gaming machines of this invention.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information and a card reader 24 for entering a magnetic striped card or smart card containing player tracking information. Further, the top box 6 may house different or additional devices than shown in the FIG. 6. For example, the top box may contain a bonus wheel or a back-lit silk screened panel which may be used to add bonus features to the game being played on the gaming machine. During a game, these devices are controlled and powered, in part, by circuitry (see FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. Those of skill in the art will understand that the present invention, as described below, can be deployed on most any gaming machine now available or hereafter developed.

Returning to the example of FIG. 6, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. During the game, the player typically views game information and game play using the video display 34.

Prior to initiating game play on the gaming machine, the player may enter playing tracking information using the card reader 24, the keypad 22, and the florescent display 16 which may be contained in a player tracking unit as previously described with reference to FIGS. 2–4 and 5A–5D. As another example, the player may enter playing tracking information using the card reader 24 and the video display 34 where the video display may be used as a touch screen to enter information. When the video display 34 is used as a touch screen to enter and display player tracking information, the key pad 22 and florescent display 16 may be eliminated from the gaming machine.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 or using some other device which enables a player to input information into the gaming machine. Certain player choices may be captured by player tracking software loaded in a memory inside of the gaming machine. For example, the rate at which a player plays a game or the amount a player bets on each game may be captured by the player tracking software.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18. The type of ticket 20 may be related to past game playing recorded by the player tracking software within the gaming machine 2. In some embodiments, these tickets may be used by a game player to obtain game services.

Figure 7:
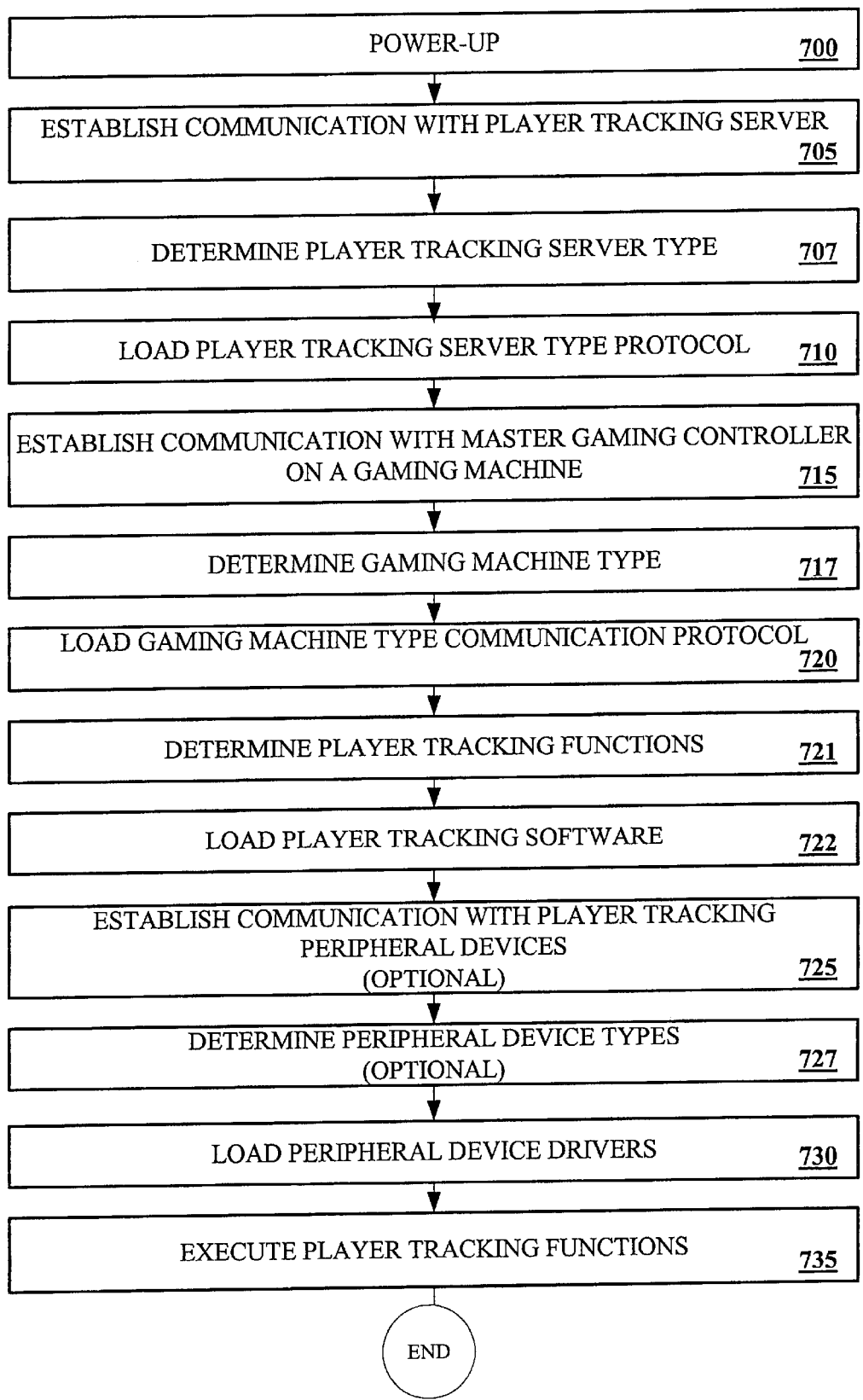
FIG. 7 is a flow chart depicting a method for initializing a gaming machine with a player tracking unit of the present invention.

FIG. 7 is a flow chart depicting a method for initializing a gaming machine with a player tracking unit of the present invention. In 700, the player tracking unit is powered-up. In 705, the player tracking unit establishes communications with a player tracking server using an initial communication protocol of some type. In 707, the player tracking server type is determined by the player tracking unit. The player tracking server type may be contained in a message sent from the player tracking server to the player tracking unit. The player tracking server type may be used by the player tracking unit to configure itself to communicate properly with the particular type of player tracking server and send player tracking information and game usage information to the player tracking server in an appropriate format. In 710, the player tracking unit loads a communication protocol configured for communicating with the player tracking server type. Also, the player tracking unit may configure itself in any other ways necessary for operating with the player tracking server of the particular type identified in 707 such as loading player tracking application software supported by the player tracking server type. In some embodiments, the player tracking server type may be included in a configuration file stored in a memory on the player tracking unit or the gaming machine. In this embodiment, the player tracking unit may access the configuration file, determine the player tracking server type and configure itself for operating with the player tracking server type prior establishing communications with the player tracking server in 705.

In 715, the player tracking unit establishes communication with a master gaming controller on the gaming machine using an initial communication protocol of some type. In 717, the player tracking unit determines the gaming machine type. In 720, the player tracking unit configures itself to communicate in a communication format used by a master gaming controller on the gaming machine such as USB or RS-232. In 721, the player tracking unit may determine which player tracking functions are to be executed by the player tracking unit. As described above, the player tracking functions may be distributed between logic devices located on the player tracking unit, located on the gaming machine or other gaming devices. For example, the master gaming controller may send game usage information directly to the player tracking server. In this example, the player tracking unit may not poll the gaming machine for game usage information because this player tracking function is performed by the gaming machine. In 722, the player tracking unit loads player tracking software necessary to perform the player tracking functions determined in 721. In some embodiments, the gaming machine type and player tracking functions may be included in a configuration file stored in a memory on the player tracking unit. In this embodiment, the player tracking unit may read the configuration file, determine the gaming machine type and player tracking functions and configure itself for operating with the gaming machine type and player tracking functions prior to establishing communications with the gaming machine in 715.

In 725 and 727, the player tracking unit may optionally establish communications with each of the player tracking peripheral devices using an initial communication protocol such as USB and determine the peripheral device types. For instance, the peripheral device type may be a card reader by a particular manufacturer. In 730, the player tracking unit may load peripheral device drivers for each type of player tracking peripheral device. Some of the peripheral devices on the player tracking unit may be operated by a master gaming controller on a gaming machine. Thus, the player tracking unit may load appropriate software allowing the master gaming controller to operate the player tracking peripheral devices (e.g. gaming devices enclosed in the player tracking unit). In 735, the player tracking unit may initiate the player tracking functions determined in 721 such as collecting game usage information from the gaming machine or communicating with a player tracking server.

Figure 8:
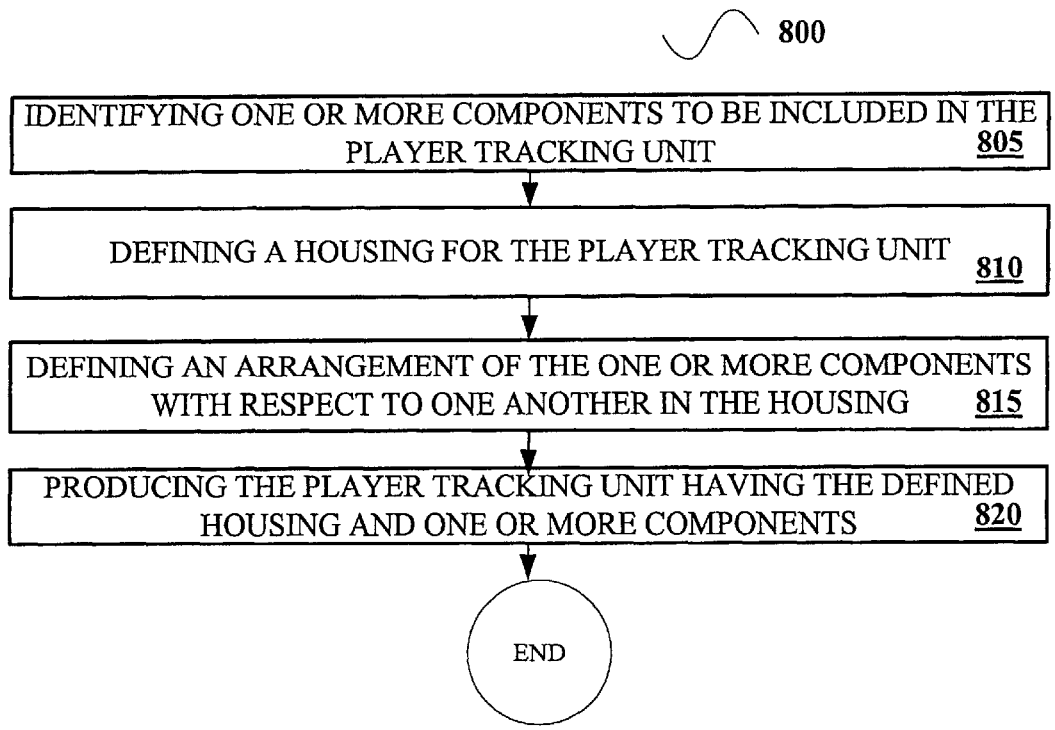
FIG. 8 is a flow chart depicting a method for of designing and producing a player tracking unit for installation in a gaming machine.

FIG. 8 is a flow chart depicting a method for of designing and producing a player tracking unit for installation in a gaming machine 800. In 805, one or more components to be included in the player tracking unit are identified. For example, one or more components may be selected from the group consisting of player tracking devices such as a card reader, a display, a finger print device, a key pad, a bonus button and a logic device. In 810, one or more housings are defined for the player tracking unit. For instance, a shape for a device housing and a logic device housing may be defined. The shape of the housings may conform to one or more dimensional standards as described with reference to FIGS. 5A–5D. In 815, an arrangement of components with respect to one another within a particular housing is defined. The arrangement of the components and the components dimensions may conform to one or more layout standards. In 820, the player tracking unit having the defined housing and one or more components is produced. The manufactured player tracking unit may be an after-market device for use in a pre-existing gaming machine.

A design method for the player tracking unit may comprise: 1) selecting a gaming machine type such as a brand from a particular manufacturer, 2) selecting one or more peripheral device types such as card readers, displays, etc., 3) consulting a table of standard dimensions and a table of standard layouts types for designing one or more housings that conform to the gaming machine type and the peripheral device types, 4) selecting housing dimensions and a layout type for said housing, 5) consulting a table of standard dimensions and standard attachment means for mounting each peripheral device type to the housing and 6) selecting a standard dimension and standard dimension and standard attachment means for each peripheral device type. To design a logic device housing, a table of standard dimensions and a standard layout types may be consulted and a logic device housing dimensions may be selected from the table. Tables with the various dimensions and layouts may stored in an electronic database as described with reference to FIG. 5. The database may be implemented on a computer system as part of CAD/CAM system. The database may store CAD/CAM representations of each component and gaming machine components that may be selected and inserted into a CAD/CAM design of a player tracking unit and a gaming machine. The CAD/CAM system may aid in packaging and layout design for the player tracking unit and the gaming machine.

Figure 9:
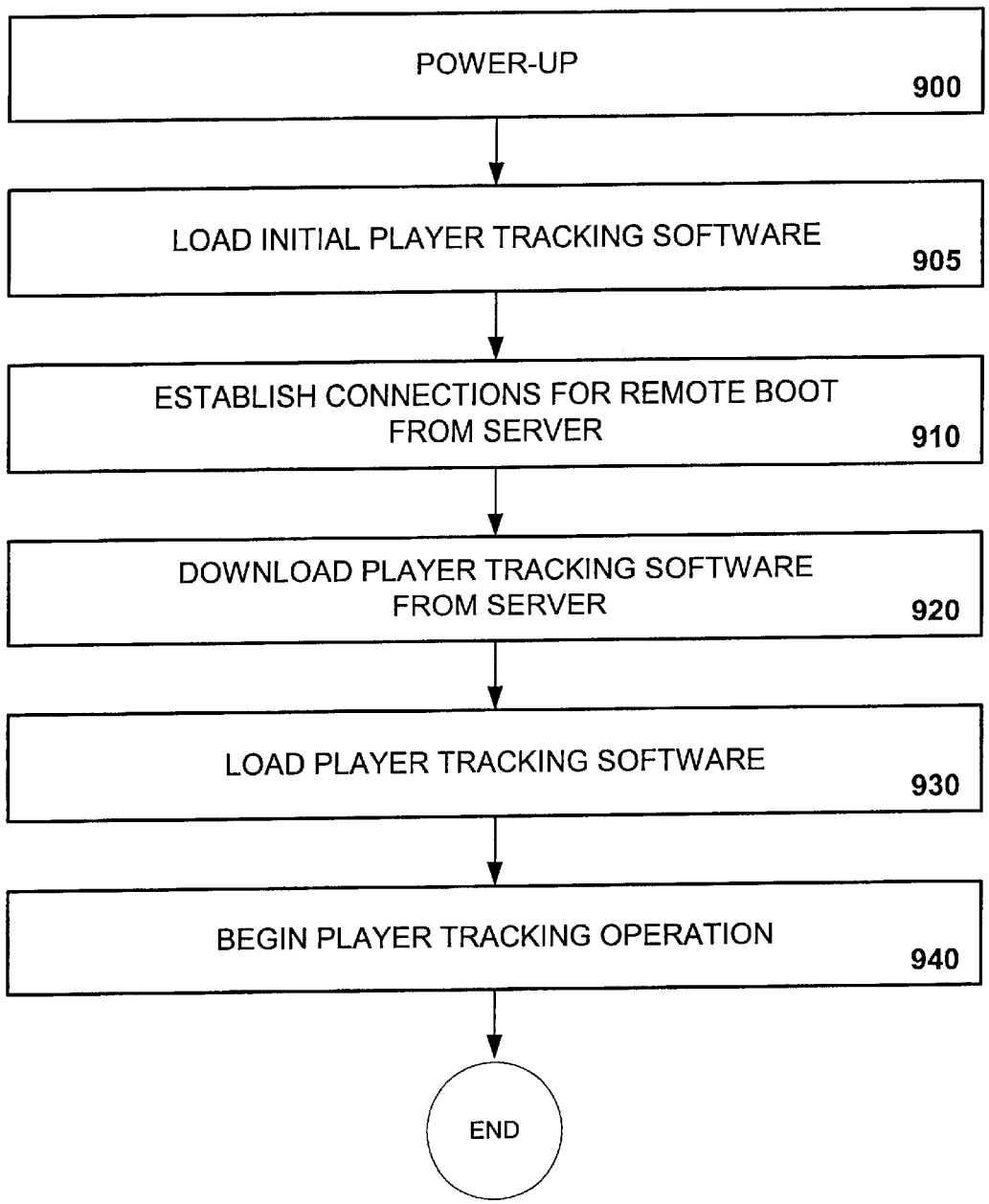
FIG. 9 is a flow chart depicting a method of configuring a player tracking unit from a remote server.

FIG. 9 is a flow chart depicting a method of configuring a player tracking unit from a remote server. In 900, the player tracking unit is powered-up. The player tracking unit may be a logic device located in a hardware unit attached to a gaming machine, a master gaming controller designed or configured to execute player tracking functions or combinations thereof. In 905, a logic device performing player tracking functions loads an initial set of player tracking software. The initial set of player tracking software may include but is not limited to software that allows the logic device to perform a generic set of player tracking functions and communication software that allows the player tracking unit to contact a remote server such as a player tracking/accounting server or a player tracking software server. In 910, the logic device establishes a communication connection with the remote server. For instance, a boot protocol, available with a TCP/IP communication may be used to establish connections with the remote server. In 920, the logic device may download player tracking software from the remote server. The player tracking software may include but is not limited to 1) one or more device drivers, 2) one or more communication protocols (e.g. player tracking communication protocols), 3) one or more player tracking applications and 4) one or more player tracking settings. As an example, the player tracking communication protocol may be described in a generic communication protocol such as a mark-up language or a proprietary communication protocol used by a particular player tracking server. In 930, the logic device may load the player tracking software downloaded from the remote server and configure itself with any player tracking settings received from the remote server. In 940, the logic device may begin player tracking operations.

One advantage of downloading player tracking software from a remote server is that it may reduce memory requirements on the player tracking unit. For instance, a player tracking unit storing communication protocols and device drivers for a large number of devices may require more memory than a player tracking unit that downloads a specified player tracking software configuration from a remote server. In addition, the downloading of player tracking software from a remote server may simplify the process of upgrading player tracking software on a player tracking device in communication with the remote server.

Although the foregoing invention has been described in some detail for purposes of clarity of understanding, it will be apparent that certain changes and modifications may be practiced within the scope of the appended claims. For instance, while the player tracking units of this invention have been depicted as having rectangular enclosures, the use of player tracking units in accordance with this invention is not so limited. For example, player tracking units may be provided with enclosures including one or more partially curved surfaces.

What is claimed is:

1. A player tracking unit comprising:
   one or more of the following peripheral devices: a card reader, a display, a key pad, a bonus button, a sound device and a biometric input device;
   a logic device designed or configured 1) to collect player tracking information from the peripheral devices, 2) to collect gaming information from a master gaming controller that controls a game played on a gaming machine and 3) to send the player tracking information and accounting information to a player tracking server; and a memory arranged to store a plurality of different communication protocols allowing the logic device to communicate with a plurality of different types of gaming machines using different communication protocols to communicate with the player tracking unit and a plurality of different types of player tracking servers using different communication protocols to communicate with the player tracking unit; and
   a standard housing for the player tracking unit, enclosing the logic device and the peripheral devices, designed or configured to fit in one of a plurality of different types of gaming machines wherein the standard housing conforms to at least one of standard dimensions and a standard layout of the peripheral devices.

2. The player tracking unit of claim 1, further comprising:
   a memory arranged to store a plurality of device drivers for each type of peripheral device.

3. The player tracking unit of claim 1, further comprising:
   a standard mounting means designed or configured to mount one of a plurality of different types of card readers in the player tracking unit.

4. The player tracking unit of claim 1, further comprising:
   a standard mounting means designed or configured to mount one of a plurality of different types of displays in the player tracking unit.

5. The player tracking unit of claim 1, further comprising:
   a standard mounting means designed or configured to mount one of a plurality of different types of key pads in the player tracking unit.

6. The player tracking unit of claim 1, further comprising:
   a standard device housing, enclosing the one or more peripheral devices and separate from a housing enclosing the logic device, designed or configured to fit in one of a plurality of different types of gaming machines wherein the standard housing conforms to at least one of standard dimensions and a standard layout of the peripheral devices.

7. The player tracking unit of claim 1, further comprising:
   a standard logic device housing, enclosing the logic device and separate from a housing enclosing the one or more peripheral devices, designed or configured to fit in one of a plurality of different types of gaming machines.

8. The player tracking unit of claim 1, further comprising:
   a network interface.

9. The player tracking unit of claim 1, wherein the network interface is a wireless interface or a wired interface.

10. The player tracking unit of claim 1, further comprising:
    a firewall.

11. The player tracking unit of claim 1, further comprising:
    a peripheral communications connection.

12. The player tracking unit of claim 11, wherein the logic device is designed or configured to communicate with the master gaming controller via the peripheral communication connection using a standard communication protocol.

13. The player tracking unit of claim 12, wherein the standard communication protocol is USB.

14. The player tracking unit of claim 11, further comprising:
    a hub connected to the peripheral communications connection and containing a plurality of peripheral communications connections.

15. The player tracking unit of claim 1, wherein the logic device may be designed or configured to receive from the master gaming controller operation instructions for one or more peripheral devices.

16. The player tracking unit of claim 1, wherein the card reader is designed or configured to read a smart card or write to the smart card.

17. The player tracking unit of claim 1, wherein the biometric input device is a finger print device.

18. The player tracking unit of claim 1, wherein the logic device is a microcontroller or a microprocessor.

19. The player tracking unit of claim 1, wherein the logic device is designed or configured to send information to a peripheral device.

20. The player tracking unit of claim 1, wherein the memory is selected from the group consisting of a flash memory, a hard drive, a CD/DVD.

21. The player tracking unit of claim 1, wherein the logic device is designed or configured to employ one or more application program interfaces.

22. The player tracking unit of claim 21, wherein the one or more application program interfaces are described using a mark-up language.

23. The player tracking unit of claim 22, wherein the mark-up language is selected from the group consisting of a hyper text mark-up language, an extensible markup language, a wireless mark-up language, and a hand-held device markup language.

24. A gaming machine comprising:
a master gaming controller designed or configured to control one or more games on the gaming machine; and
a player tracking unit comprising;
one or more of the following peripheral devices: a card reader, a display, a key pad, a bonus button and a biometric input device;
a logic device, separate from the master gaming controller, designed or configured to collect player tracking information from the peripheral devices and to collect accounting information from a master gaming controller on a gaming machine and send the player tracking information and the accounting information to a player tracking server; and
a memory arranged to store a plurality of different communication protocols allowing the logic device to communicate with a plurality of different types of gaming machines using different communication protocols to communicate with the player tracking unit and a plurality of different types of player tracking servers using different communication protocols to communicate with the player tracking unit; and
a standard logic device housing, enclosing the logic device and separate from a housing adapted for coupling the one or more peripheral devices to the gaming machine, designed or configured to fit in one of a plurality of different types of gaming machines.

25. The gaming machine of claim 24, wherein the game is a video bingo game, a video lottery game, a video blackjack game, a video slot game, a mechanical slot game, a video poker game, a video keno game, a video pachinko game, a video game of chance and a video card game.

26. The gaming machine of claim 24, wherein the gaming machine includes mounting means designed to mount a player tracking unit enclosed in a standard housing.

27. The gaming machine of claim 24, wherein the master gaming controller includes a memory arranged to store software that allows the master gaming controller to detect gaming events on the one or more peripheral devices.

28. The gaming machine of claim 24, further comprising:
a peripheral communication connection.

29. The gaming machine of claim 28, wherein the master gaming controller includes a memory arranged to store software for a communication protocol that allows communication with the player tracking unit via the peripheral communication connection.

30. The gaming machine of claim 29, wherein the communication protocol is USB.

31. The gaming machine of claim 24, wherein the logic device on said player tracking unit is designed or configured to receive instructions from the master gaming controller controlling the operation of one or more of said peripheral devices.

32. The gaming machine of claim 24, wherein the master gaming controller executes player tracking software allowing the master gaming controller to perform one or more player tracking functions.

33. The gaming machine of claim 24, wherein the logic device on said player tracking unit is designed or configured to send information to one or more of said peripheral devices.

34. The gaming machine of claim 24, wherein the logic device on said player tracking unit is designed or configured to send operating instructions to one or more of said peripheral devices.

35. The gaming machine of claim 24, wherein the logic device is designed or configured to employ one or more application program interfaces.

36. The gaming machine of claim 35, wherein the one or more application program interfaces are described using a mark-up language.

37. The gaming machine of claim 36, wherein the mark-up language is selected from the group consisting of a hyper text mark-up language, an extensible markup language, a wireless mark-up language, and a hand-held device markup language.

38. The gaming machine of claim 24, wherein the master gaming controller is designed or configured to employ one or more application program interfaces.

39. The gaming machine of claim 38, wherein the one or more application program interfaces are described using a mark-up language.

40. The gaming machine of claim 39, wherein the mark-up language is selected from the group consisting of a hyper text mark-up language, an extensible markup language, a wireless mark-up language, and a hand-held device markup language.

41. A player tracking gaming peripheral comprising:
a peripheral communication connection;
a peripheral controller configured or designed to control communications with a master gaming controller that controls a game played on a gaming machine and to receive instructions from the master gaming controller for one or more of the following peripheral devices: a card reader, a display, a key pad, a bonus button and a biometric input device wherein the instructions from the master gaming controller allow the player tracking gaming peripheral to operate on player tracking events; and
a standard housing for the player tracking gaming peripheral designed or configured to fit in one of a plurality of different types of gaming machines wherein the standard housing conforms to at least one of standard dimensions and a standard layout of the one or more peripheral devices.

42. The player tracking gaming peripheral of claim 41, further comprising:
a peripheral interface that directly connects to the one or more peripheral devices.

43. The player tracking gaming peripheral of claim 41, further comprising:
a hub connected to the peripheral communications connection and containing a plurality of peripheral communications connections.

44. The player tracking gaming peripheral of claim 41, wherein the peripheral controller includes a control microprocessor, separate from the master gaming controller, designed or configured to communicate over the peripheral communications connection.

45. The player tracking gaming peripheral of claim 41, wherein the peripheral controller includes a non-volatile memory arranged to store at least one of a) configuration parameters specific to the player tracking gaming peripheral and b) state history information of the player tracking gaming peripheral.

46. The player tracking gaming peripheral of claim 41, wherein the peripheral controller includes a non-volatile memory arranged to store operating code for the gaming peripheral.

47. The player tracking gaming peripheral of claim 41, wherein the peripheral controller includes a memory arranged to store a plurality of device drivers for each type of peripheral device.

48. The player tracking gaming peripheral of claim 41, wherein the peripheral controller includes a memory arranged to store software for a communication protocol that allows communication with the master gaming controller.

49. The player tracking gaming peripheral of claim 41, wherein the communication protocol is USB.

50. The player tracking gaming peripheral of claim 41, wherein the card reader is designed or configured to read a smart card or write to the smart card.

51. The player tracking gaming peripheral of claim 41, wherein the biometric input device is a finger print device.

52. The player tracking gaming peripheral of claim 41, further comprising:
   a standard mounting means designed or configured to mount one of a plurality of different types of card readers in the player tracking gaming peripheral.

53. The player tracking gaming peripheral of claim 41, further comprising:
   a standard mounting means designed or configured to mount one of a plurality of different types of displays in the player tracking gaming peripheral.

54. The player tracking gaming peripheral of claim 41, further comprising:
   a standard mounting means designed or configured to mount one of a plurality of different types of key pads in the player tracking gaming peripheral.

55. The player tracking gaming peripheral of claim 41, wherein the peripheral controller is designed or configured to employ one or more application program interfaces.

56. The player tracking gaming peripheral of claim 55, wherein the one or more application program interfaces are described using a mark-up language.

57. The player tracking gaming peripheral of claim 56, wherein the mark-up language is selected from the group consisting of a hyper text mark-up language, an extensible markup language, a wireless mark-up language, and a hand-held device markup language.

58. A gaming machine comprising:
   a master gaming controller designed or configured to control one or more games on the gaming machine;
   a network interface for communicating with a player tracking server; and
   a player tracking gaming peripheral, the player tracking gaming peripheral comprising;
      a peripheral communication connection;
      a peripheral controller configured or designed to control communications with the master gaming controller and to receive instructions from the master gaming controller for one or more of the following peripheral devices: a card reader, a display, a key pad, a bonus button and a biometric input device wherein the instructions from the master gaming controller allow the player tracking gaming peripheral to operate on player tracking events; and
   a standard housing for the player tracking gaming peripheral designed or configured to fit in one of a plurality of different types of gaming machines wherein the standard housing conforms to at least one of standard dimensions and a standard layout of the one or more peripheral devices.

59. The gaming machine of claim 58, wherein the gaming machine wherein the game is a video bingo game, a video lottery game, a video black jack game, a video slot game, a mechanical slot game, a video poker game, a video keno game, a video pachinko game, a video game of chance and a video card game.

60. The gaming machine of claim 58, wherein the master gaming controller includes a memory arranged to store software for a standard device identification protocol for the player tracking gaming peripheral and the one or more peripheral devices.

61. The gaming machine of claim 58, wherein the master gaming controller includes a memory arranged to store a plurality of device drivers for at least some of each different type of peripheral device.

62. The gaming machine of claim 58, wherein the master gaming controller is designed or configured to send player tracking information and accounting information using the network interface to the player tracking server.

63. The gaming machine of claim 58, wherein the master gaming controller is designed or configured to receive player tracking information from the player tracking server using the network interface.

64. The gaming machine of claim 58, wherein the network interface is a wireless interface or a wired interface.

65. The gaming machine of claim 58, wherein the master gaming controller includes a memory arranged to store software that allows the master gaming controller to detect gaming events on the one or more peripheral devices.

66. The gaming machine of claim 65, wherein the gaming event is a player tracking event.

67. The gaming machine of claim 58, wherein the master gaming controller includes a memory arranged to store software for a communication protocol that allows communication with the player tracking gaming peripheral via the peripheral communication connection.

68. The gaming machine of claim 67, wherein the communication protocol is USB.

69. The gaming machine of claim 58, wherein the player tracking gaming peripheral is designed or configured to receive high-level instructions from the master gaming controller that do not specify precise control of the operation for one or more of said peripheral devices and wherein the peripheral controller provides low-level instructions, following the high-level instructions, precisely controlling the operation of one or more of said peripheral devices.

70. The gaming machine of claim 58, wherein the master gaming controller includes a memory arranged to store a plurality of different types of communication protocols allowing the gaming machine to communicate with a plurality of different types of player tracking servers using different communication protocols to communicate with the gaming machine.

71. The gaming machine of claim 70, wherein the mark-up language is selected from the group consisting of hyper text mark-up language, extensible markup language, wireless mark-up language, and hand-held device markup language.

72. The gaming machine of claim 58, wherein the gaming machine includes mounting means designed to mount a player tracking gaming peripheral enclosed in a standard housing.

73. The gaming machine of claim 58, wherein the peripheral controller is designed or configured to employ one or more application program interfaces.

74. The gaming machine of claim 73, wherein the one or more application program interfaces are described using a mark-up language.

75. The gaming machine of claim 58, wherein the master gaming controller is designed or configured to employ one or more application program interfaces.

76. The gaming machine of claim 75, wherein the one or more application program interfaces are described using a mark-up language.

77. The gaming machine of claim 76, wherein the mark-up language is selected from the group consisting of hyper text mark-up language, extensible markup language, wireless mark-up language, and hand-held device markup language.

78. The gaming machine of claim 58, wherein the peripheral controller includes a memory arranged to store a plurality of different types of communication protocols allowing the gaming machine to communicate with a plurality of different types of player tracking servers using different communication protocols to communicate with the gaming machine.

79. The gaming machine of claim 58, wherein the peripheral controller is designed or configured to send player tracking information and accounting information using the network interface to the player tracking server.

80. The gaming machine of claim 58, wherein the peripheral controller is designed or configured to receive player tracking information from the player tracking server using the network interface.

81. The gaming machine of claim 58, wherein the peripheral controller and the master gaming controller are designed or configured to execute one or more essentially identical player tracking software applications.

82. A player tracking unit comprising:
   one or more of the following peripheral devices: a card reader, a display, a key pad, a bonus button, a sound device and a biometric input device;
   a logic device designed or configured 1) to collect player tracking information from the peripheral devices, 2) to collect gaming information from a master gaming controller that controls a game played on a gaming machine and 3) to send the player tracking information and accounting information to a player tracking server;
   a memory arranged to store a plurality of different communication protocols allowing the logic device to communicate with a plurality of different types of gaming machines using different communication protocols to communicate with the player tracking unit and a plurality of different types of player tracking servers using different communication protocols to communicate with the player tracking unit; and
   a standard logic device housing, enclosing the logic device and separate from a housing adapted for coupling the one or more peripheral devices to the gaming machine, designed or configured to fit in one of a plurality of different types of gaming machines.

83. The player tracking unit of claim 82, further comprising:
   a standard housing for the player tracking unit, enclosing the logic device and the peripheral devices, designed or configured to fit in one of a plurality of different types of gaming machines wherein the standard housing conforms to at least one of standard dimensions and a standard layout of the peripheral devices.

84. The player tracking unit of claim 82, further comprising:
   a standard mounting means designed or configured to mount one of a plurality of different types of card readers in the player tracking unit.

85. The player tracking unit of claim 82, further comprising:
   a standard mounting means designed or configured to mount one of a plurality of different types of displays in the player tracking unit.

86. The player tracking unit of claim 82, further comprising:
   a standard mounting means designed or configured to mount one of a plurality of different types of key pads in the player tracking unit.

87. The player tracking unit of claim 82, further comprising:
   a standard device housing, enclosing the one or more peripheral devices and separate from a housing enclosing the logic device, designed or configured to fit in one of a plurality of different types of gaming machines wherein the standard housing conforms to at least one of standard dimensions and a standard layout of the peripheral devices.

88. The player tracking unit of claim 82, further comprising:
   a standard logic device housing, enclosing the logic device and separate from a housing enclosing the one or more peripheral devices, designed or configured to fit in one of a plurality of different types of gaming machines.

89. The player tracking unit of claim 82, further comprising:
   a network interface.

90. The player tracking unit of claim 82, wherein the network interface is a wireless interface or a wired interface.

91. The player tracking unit of claim 82, further comprising:
   a firewall.

92. The player tracking unit of claim 82, further comprising:
   a peripheral communications connection.

93. The player tracking unit of claim 92, wherein the logic device is designed or configured to communicate with the master gaming controller via the peripheral communication connection using a standard communication protocol.

94. The player tracking unit of claim 93, wherein the standard communication protocol is USB.

95. The player tracking unit of claim 92, further comprising:
   a hub connected to the peripheral communications connection and containing a plurality of peripheral communications connections.

96. The player tracking unit of claim 82 wherein the logic device may be designed or configured to receive from the master gaming controller operation instructions for one or more peripheral devices.

97. A player tracking unit comprising:
   one or more of the following peripheral devices: a card reader, a display, a key pad, a bonus button, a sound device and a biometric input device;
   a logic device designed or configured 1) to collect player tracking information from the peripheral devices, 2) to collect gaming information from a master gaming controller that controls a game played on a gaming machine and 3) to send the player tracking information and accounting information to a player tracking server;
   a memory arranged to store a plurality of different communication protocols allowing the logic device to communicate with a plurality of different types of gaming machines using different communication protocols to communicate with the player tracking unit and a plurality of different types of player tracking servers using different communication protocols to communicate with the player tracking unit; and a standard device housing, enclosing the one or more peripheral devices and separate from a housing enclosing the logic device, designed or configured to fit in one of a plurality of different types of gaming machines wherein the standard housing conforms to at least one of standard dimensions and a standard layout of the peripheral devices.

98. The player tracking unit of claim 97, further comprising:

a standard housing for the player tracking unit, enclosing the logic device and the peripheral devices, designed or configured to fit in one of a plurality of different types of gaming machines wherein the standard housing conforms to at least one of standard dimensions and a standard layout of the peripheral devices.

99. The player tracking unit of claim 97, further comprising:

a standard mounting means designed or configured to mount one of a plurality of different types of card readers in the player tracking unit.

100. The player tracking unit of claim 97, further comprising:

a standard mounting means designed or configured to mount one of a plurality of different types of displays in the player tracking unit.

101. The player tracking unit of claim 97, further comprising:

a standard mounting means designed or configured to mount one of a plurality of different types of key pads in the player tracking unit.

102. The player tracking unit of claim 97, further comprising:

a standard logic device housing, enclosing the logic device and separate from a housing enclosing the one or more peripheral devices, designed or configured to fit in one of a plurality of different types of gaming machines.

103. The player tracking unit of claim 97, further comprising:

a standard logic device housing, enclosing the logic device and separate from a housing enclosing the one or more peripheral devices, designed or configured to fit in one of a plurality of different types of gaming machines.

104. The player tracking unit of claim 97, further comprising:

a network interface.

105. The player tracking unit of claim 97, wherein the network interface is a wireless interface or a wired interface.

106. The player tracking unit of claim 97, further comprising:

a firewall.

107. The player tracking unit of claim 97, further comprising:

a peripheral communications connection.

108. The player tracking unit of claim 107, wherein the logic device is designed or configured to communicate with the master gaming controller via the peripheral communication connection using a standard communication protocol.

109. The player tracking unit of claim 108, wherein the standard communication protocol is USB.

110. The player tracking unit of claim 107, further comprising:

a hub connected to the peripheral communications connection and containing a plurality of peripheral communications connections.

111. The player tracking unit of claim 97, wherein the logic device may be designed or configured to receive from the master gaming controller operation instructions for one or more peripheral devices.

* * * * *